(12) United States Patent
Baier et al.

(10) Patent No.: US 10,076,132 B2
(45) Date of Patent: Sep. 18, 2018

(54) METHODS OF INCORPORATING MICROPELLETS OF FINE PARTICLE NUTRIENTS INTO SNACK FOOD PRODUCTS

(71) Applicant: Frito-Lay North America, Inc., Plano, TX (US)

(72) Inventors: Stefan K. Baier, Hartsdale, NY (US); Ajay Rajeshwar Bhaskar, Allen, TX (US); Eugenio Bortone, McKinney, TX (US); Pierre Faa, Frisco, TX (US); Chien-Seng Hwang, Frisco, TX (US); Jorge C. Morales-Alvarez, Plano, TX (US); Deepali Palta, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 64 days.

(21) Appl. No.: 15/273,938

(22) Filed: Sep. 23, 2016

(65) Prior Publication Data
US 2017/0006910 A1   Jan. 12, 2017

Related U.S. Application Data

(62) Division of application No. 13/446,570, filed on Apr. 13, 2012, now Pat. No. 9,510,617.

(51) Int. Cl.
*A23P 10/30* (2016.01)
*A23P 30/20* (2016.01)
(Continued)

(52) U.S. Cl.
CPC .............. *A23P 10/30* (2016.08); *A21D 2/36* (2013.01); *A23L 7/10* (2016.08); *A23L 7/117* (2016.08);
(Continued)

(58) Field of Classification Search
CPC .......... A23L 1/10; A23L 1/304; A23L 1/2165; A23L 1/305; A23L 1/01; A23L 1/025;
(Continued)

(56) References Cited

U.S. PATENT DOCUMENTS 3,476,567 A   11/1969   Wood
3,690,896 A   9/1972   Maxwell
(Continued)

FOREIGN PATENT DOCUMENTS

WO   WO 2011031841 A1 *   3/2011   .............. A23P 20/12

OTHER PUBLICATIONS

Maddox Metal Works: Fried Extruder Line, downloanded from www.maddoxmetalworks.com/food_fried.htm (1 page).
(Continued)

*Primary Examiner* — Jyoti Chawla
(74) *Attorney, Agent, or Firm* — Colin P. Cahoon; Stephen Y. Liu; Carstens & Cahoon, LLP

(57) ABSTRACT

Nutritious granular materials of fine particle sizes agglomerated within versatile micropellets are useful for inserting significant amounts of nutritious properties into snack foods. Expandable micropellet-containing formulations provide for introduction of fine particle ingredients such as proteins, minerals and other components or desirable nutrients into food processing lines not typically amenable to the fine particle sizes. Micropellet-containing formulations may consist entirely of micropellets, or may contain an expandable starch such as, for example, corn meal, sheeted doughs, and expanded collet products onto which the micropellets may be basted.

56 Claims, 16 Drawing Sheets

(51) Int. Cl.
*A23L 7/10* (2016.01)
*A23L 7/117* (2016.01)
*A23L 7/135* (2016.01)
*A23L 7/161* (2016.01)
*A23L 7/17* (2016.01)
*A23L 33/16* (2016.01)
*A23L 33/17* (2016.01)
*A23L 33/175* (2016.01)
*A23L 33/185* (2016.01)
*A23L 33/19* (2016.01)
*A21D 2/36* (2006.01)
*A21D 13/00* (2017.01)
*A23L 33/21* (2016.01)
*A23L 7/165* (2016.01)
*A21D 2/00* (2006.01)

(52) U.S. Cl.
CPC ............... *A23L 7/135* (2016.08); *A23L 7/161* (2016.08); *A23L 7/17* (2016.08); *A23L 33/16* (2016.08); *A23L 33/17* (2016.08); *A23L 33/175* (2016.08); *A23L 33/185* (2016.08); *A23L 33/19* (2016.08); *A23P 30/20* (2016.08); *A21D 2/00* (2013.01); *A21D 13/00* (2013.01); *A23L 7/165* (2016.08); *A23L 33/21* (2016.08); *A23V 2002/00* (2013.01)

(58) Field of Classification Search
CPC .......... A23L 33/16; A23L 7/117; A23L 7/135; A23L 33/21; A23L 33/175; A23L 33/17; A23L 7/17; A23L 33/19; A23L 7/10; A23L 33/185; A23L 7/165; A23L 7/161; A21D 2/186; A21D 13/00; A21D 2/00; A23P 1/025; A23P 1/12; A23P 1/02; A23P 10/30; A23P 10/20; A23P 30/20
USPC ................ 426/658, 661, 242, 285, 443, 453
See application file for complete search history.

(56) References Cited

U.S. PATENT DOCUMENTS

| | | | | |
|---|---|---|---|---|
| 4,517,204 | A * | 5/1985 | Mottur | A23L 33/24 426/302 |
| 5,480,669 | A * | 1/1996 | Zallie | A21D 2/186 426/516 |
| 5,777,102 | A | 7/1998 | Larsen | |
| 5,827,557 | A | 10/1998 | Weinstein | |
| 6,607,772 | B1 | 8/2003 | Bortone | |
| 7,235,276 | B2 | 6/2007 | Allen et al. | |
| 2004/0022910 | A1 | 2/2004 | Keller | |
| 2004/0037926 | A1 | 2/2004 | Akimoto | |
| 2008/0102165 | A1 | 5/2008 | Ning et al. | |
| 2008/0248179 | A1 | 10/2008 | Anand et al. | |
| 2011/0020503 | A1* | 1/2011 | Baur | A23L 1/0023 426/96 |
| 2013/0273209 | A1 | 10/2013 | Baier et al. | |

OTHER PUBLICATIONS

My James "Twisties Roll: Is There Anything Better Than Extruded Corn Puffs Between Buttered Bread Rolls?" Mar. 12, 2011, downloaded from http://acquiredcomfort.blogspot.com/2011/03/twisties-roll-is-there-anything-better.html (4 pages).

* cited by examiner

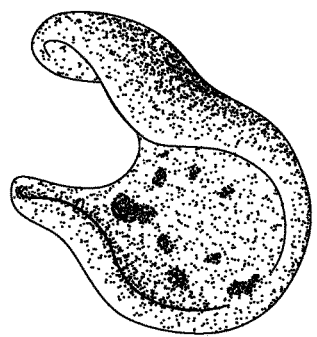
*FIG. 11B*
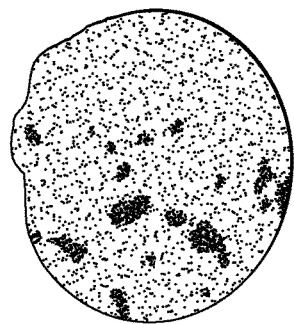
*FIG. 11A*
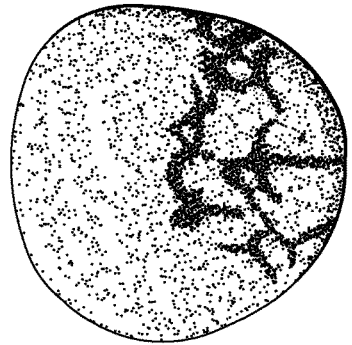
*FIG. 11C*
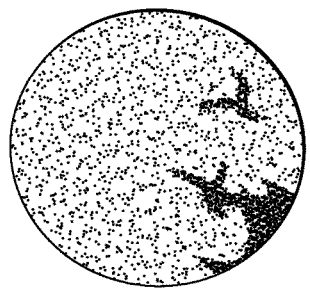
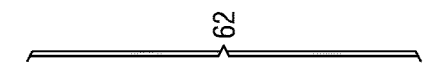
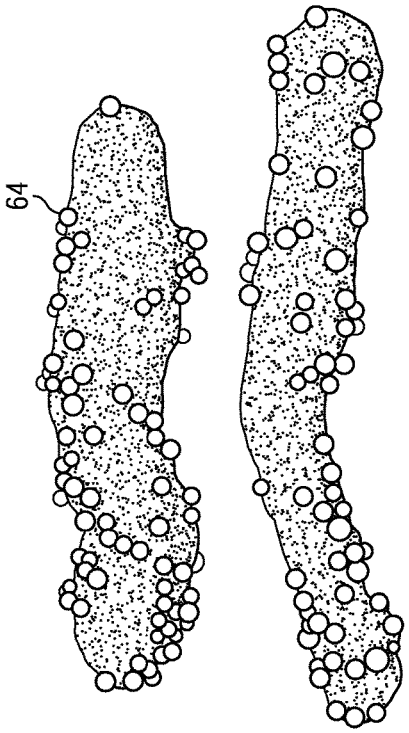
*FIG. 10*
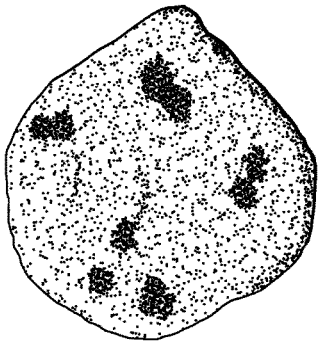

METHODS OF INCORPORATING MICROPELLETS OF FINE PARTICLE NUTRIENTS INTO SNACK FOOD PRODUCTS

CROSS REFERENCE TO RELATED APPLICATION

This application is a Divisional application from U.S. Ser. No. 13/446,570 filed Apr. 13, 2012, the disclosures of which are herein incorporated by reference.

BACKGROUND

1. Technical Field

The present invention generally relates to methods of incorporating ingredients comprised of fine particles that are otherwise difficult to work with into a variety of snack food products. In particular, the present invention relates to micropellets comprising nutritious powder components and the snack food products made therewith.

2. Description of Related Art

Grains such as corn are highly useful ingredients for the preparation of ready-to-eat snack food products. While these grains contain valuable nutrients, the incorporation of nutritionally advantageous material and/or functional ingredients from other sources remains a topic of high interest in the food industry. However, such inclusion is rarely an easy task. The problems that most food processing platforms experience lie, to some extent, with the high temperatures and/or high pressures used in the production and processing of ready-to-eat snack food products. Such conditions tend to substantially degrade any heat-labile ingredients to the point of significant or complete loss of functionality. Cooking processes tend to change minerals, amino acids and vitamins into unusable forms, destroying and heat denaturing desirable nutrients of many heat-labile components. Thus, inclusion of amino acids, proteins, flavors, spices, vitamins, minerals and other heat-labile ingredients in general tends to be problematic due to the loss of their structure with a correlating undesired loss of nutritional properties of these ingredients when subjected to high temperatures or pressures for cooking. Exacerbating the problem is the small granular or powder-like forms in which many of these ingredients are typically available. These forms often prove difficult and, in some cases, even impossible to incorporate into certain production lines.

Corn collets, for example, are popular consumer items produced and marketed under the Cheetos® brand label, for which there exists a great demand. These products are generally made by extruding moistened corn meal through an extruder, followed by a drying step such as baking or frying to remove additional moisture after extrusion to produce shelf-stable, ready-to-eat snack products. Since the introduction of extruders in the industry, many different varieties of these cornmeal snacks have been introduced. However, corn, or cornmeal, remains by far the most common ingredient used for these direct-expanded snack food products; not only due to the desirable expansion properties of corn, but also due to the equipment (or extruder) that dictates and often limits the range of usable raw materials.

FIG. 1 depicts one well-liked variety of corn collets, known as random corn collets 2, having unique, twisted ("random") shapes and protrusions. These dense random corn collets 2 comprise a unique and highly desirable crunchy texture that can only be produced via specialized extrusion processes, utilizing a rotating disk die extruder. It is a widely known and generally accepted fact in the industry that rotating disk die extruders (also known as random extruders) cannot handle flour-like granular materials. Instead, random extruder formulations typically comprise only corn grits or corn meal to create the collets 2 of FIG. 1. By way of example, Tables 1 and 2 provide, respectively, a typical corn meal particle size distribution for use with a random extruder and a typical formula as introduced into a random extruder.

TABLE 1

Corn meal Specifications

| US sieve size | Typical analysis (%) |
|---|---|
| on 16 | 0 |
| on 20 | <1 |
| on 25 | 9 |
| on 30 | 43 |
| on 40 | 45 |
| on 50 | 2 |
| through 50 | <1 |

TABLE 2

Fried corn collet formula

| Ingredient | Into Extruder (%) |
|---|---|
| Corn meal | 96 |
| Water | 4 |

Introduction of anything other than refined farinaceous materials such as corn meal (having bran and germ removed) into the random extruder has proved extremely difficult. In particular, granular materials such as flour or powder typically cause blockage and halt production in random extrusion lines. Very little, if anything, has been done in the industry to address the problems presented by the random extruder since its introduction in the 1940s. While it may be possible to incorporate some amounts of other ingredients to slightly modify the direct expanded products, to date, these amounts are not large enough to significantly vary the nutritional properties of the random collet. Indeed, it seems simply accepted that the random extruder has very narrow capabilities in terms of formula or ingredient variations.

Consequently, it remains desirable to have a method for incorporating flour-like ingredients in the random extruder. In particular, the introduction of these ingredients into a random extruder while mimicking the appealing characteristics of the crunchy corn collet 2 is highly desirable; namely, taste, appearance and mouthfeel (or texture). There is further a need for methods of eliminating and overcoming the problems caused by the narrow capabilities of the random extruder as well as high temperature processes that degrade heat sensitive nutrients. In addition, it is desirable to have methods that allow for taking advantage of the nutritional aspects of ingredients that may be comprised of fine or flour-like particles. Such methods should allow for the inclusion of high amounts of these nutritional components other than grains into snack foods, including, for instance, the highly sought-after, dense and crunchy random corn collets 2. It is also desired that the introduction of ingredients other than corn not interfere with commercial production throughput levels, while advantageously affecting the nutritional aspects of the final snack food product. Such snack food products should emulate the organoleptic properties, including taste and texture, of a conventionally produced shelf stable and ready to eat snack food product made of grains such as corn.

BRIEF DESCRIPTION OF THE DRAWINGS

The novel features believed characteristic of the invention are set forth in the appended claims. The invention itself, however, as well as a mode of use, further objectives and advantages thereof, will be best understood by reference to the following detailed description of illustrative embodiments when read in conjunction with the accompanying drawings, wherein:

FIG. 10 depicts a plurality of random collets made according to a third aspect.

FIG. 11A depicts an expanded snack food with micropellets according a fourth aspect.

FIG. 11B depicts a snack food in both pre-expanded and expanded states according to another aspect.

FIG. 11C depicts a snack food in both pre-expanded and expanded states according to another aspect.

DETAILED DESCRIPTION

Figure 1:
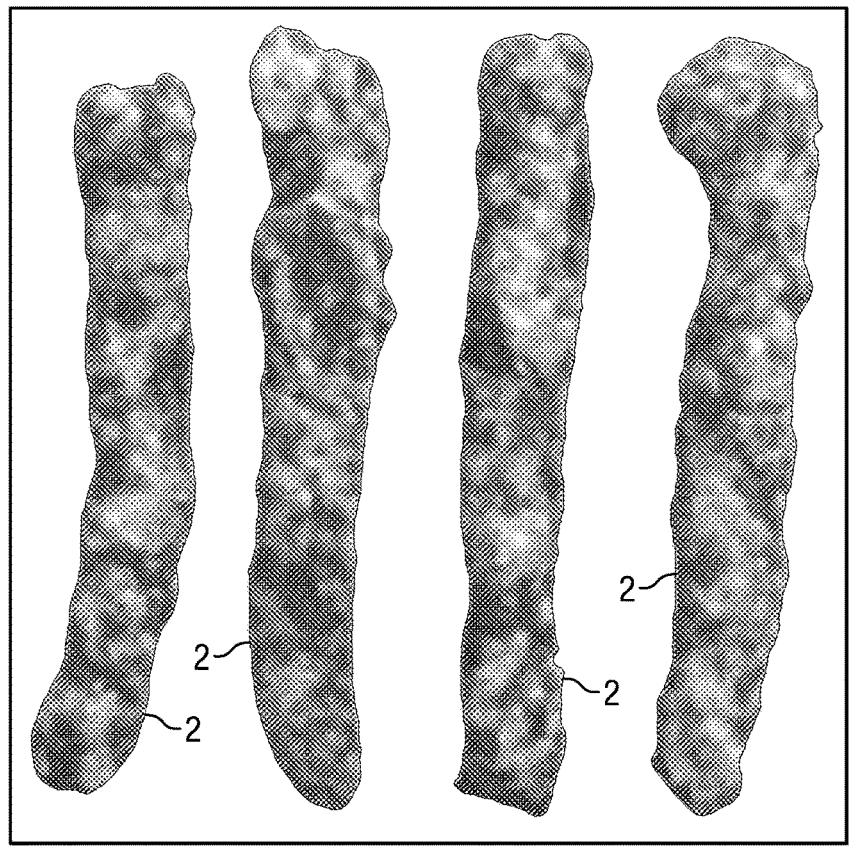
FIG. 1 depicts an illustration of typical random corn collets as known in the industry.

Applicant has overcome the obstacles of incorporating ingredients comprising fine particle sizes into food products, providing for methods of diversifying and expanding the number of ingredients introduced into snack food products. Specifically, the method described herein helps overcome the poor conveyance properties of the random extruder to successfully include significant amounts of ingredients other than corn. To date, this has proven virtually impossible. However, unique micropellets containing desired nutritious components comprised of fine particle size allows for the incorporation of diverse components into food processing lines that have never before been amenable to varied ingredients. By agglomerating or pelletizing fine particles into discrete particles that can be conveyed through a random extruder, a wide variety of ingredients (including without limitation minerals, vitamins, proteins, fibers, whole grains, and flavors) can be incorporated into snack foods such as the random corn collet 2 allowing for the modification of the nutritional content of the snack foods.

Generally, micropellet agglomerates, referred to as a "micropellets," comprised of fine ingredients such as, for example, flours, powders, and any other fine materials comprising small particle sizes, are used to create a variety of snack foods. The micropellets may comprise any number of minerals, proteins, flavors, vitamins, tubers, grains or other food components, regardless of fine size, for use in the production of snack foods. In one embodiment, micropellets are comprised of a starch agglomerated together with a mineral. In another embodiment, micropellets comprise a starch agglomerated with a protein. In one embodiment, a formulation of micropellets comprises starch and at least one other nutritional flour. In some embodiments, the starch is derived form a cereal grain such as corn. In some embodiments, the other nutritional flour comprises a non-starch component.

The micropellets are highly versatile and prove useful in a number of methods as described herein. Micropellet-containing formulations can be used in a variety of cooking processes. For example, the micropellets are capable of maintaining their physical integrity when subjected to the high shear region of the random extruder, where the starch matrix of the micropellet undergoes phase transition and plasticizes similar to the traditional corn meal formulations used. Thus, in one embodiment, the micropellets may be used with random extrusion processes.

In some embodiments, a micropellet-containing formulation comprises a starch-based material with the micropellets. In one embodiment, the starch-based material may comprise an unagglomerated granular starch-comprising component such as one derived from corn and having expanding properties. Micropellets may be combined with corn meal, for example, and cooked using a random extruder to create random collets. In another embodiment, the starch-based material comprises an expanded product such as direct-expanded collets, onto which the micropellets can be basted prior to a cooking process such as frying or baking. In another embodiment, the micropellets may be incorporated into a starch-based dough, with subsequent cooking steps to create a snack food product. Thus, the micropellets can be combined with a variety of starches in a number of processing lines.

In an alternate embodiment, a formulation comprising substantially 100% micropellets having an expandable property is incorporated into a random extruder, without the need for combining the micropellets with an expandable starch-based material. Resulting collets contain diverse ingredients with varied nutritional aspects, as compared to the traditional collets comprised of corn meal. Thus, the micropellets described herein provide for a wide array of snack food products comprising varied nutritional content.

The micropellet-containing formulations described herein can be incorporated into processing lines that would otherwise completely degrade, alter or affect certain nutritional components, processing runs and/or textural aspects of final products. Versatile micropellets comprised of flour or powder-like particles may be introduced into a variety of ready-to-eat snack foods. In one aspect, the micropellets help expand upon the raw materials that may be introduced into a random extruder. In another aspect, the micropellets may be used in subsequent processing steps in the random extrusion line (i.e., following extrusion). In another aspect, the micropellets provide for incorporation of additional nutritional ingredients into dough products prior to cooking processes.

Agglomeration transforms fine particles into larger particles by the introduction of external forces, and is known to add value to many processes in a number of industries involving the use of finely divided solid materials. For example, in the food industry, agglomerated flours have been particularly useful in the production of foods known for the convenience factor of instant preparation, wherein agglomerates are prepared so that they will instantly disburse or dissolve in liquids. However, to date, these technologies have yet to be successfully introduced into snack foods as described herein. In particular, the introduction of agglomerated flours as disclosed herein, as well as the specific formulations of the micropellets allow for incorporation into a number of cooking methods or lines.

The terminology employed herein is used for the purpose of describing particular embodiments and should not be considered limiting.

As used herein, the phrase "fine particle" or "fine" is used to refer to powders, flours, and any other similarly sized fine materials comprising small particles having a particle size of less than about 300 microns. In one embodiment, the fine particles may comprise particle sizes of about 250 microns or less. In another embodiment, the powders comprise fine particles of about 200 microns or less prior to agglomeration into micropellets. In some embodiments, the particle size is between about 150 to about 250 microns in diameter (or less than 60 mesh). Suitable fine ingredients may comprise a number of nutritional properties and may include without limitation proteins, fruits, berries, vegetables, minerals, calcium, herbs, vitamins, inulin, fibers, whole grains, starches, beans, fish, seafood, meats, peas, botanical proteins, flavors, probiotics, or any supplements thereof, whether natural or artificial, as well as any combination thereof. The fine particle size may be a result of any number of manufacturing methods including without limitation grinding, crushing, milling, pounding, or pulverizing processes; or, alternatively, as a result of nature or natural causes.

As used herein, the term "agglomerate" relates to the product of some size enlargement process such as one resulting in a substantially solid micropellet as described herein. As used herein, the terms agglomeration and pelletization are used interchangeably.

As used herein, the term "micropellet" is meant to refer to a substantially solid small pellet agglomerate comprising a spherical or cylindrical shape and a diameter no larger than about 1.8 mm (1800 microns) with a plurality of agglomerated components of fine particle size therein. The micropellets are capable of plasticizing into a viscoelastic dough and comprise an expanding property, which causes the gelatinization of the micropellets when subjected to heat or short cooking processes such as random extrusion or baking, or a sudden pressure drop. The micropellets described herein have low water absorption index and can thus last for very long time when submerged in water, absorbing very little moisture. Further details of the embodiments, formulations and manufacturing of the micropellet agglomerates presented herein are provided below and such details should be understood to fall within these characteristics.

Micropellets

The micropellets will now be further described. It should be understood that these micropellets may be manufactured as described herein or obtained or purchased from any vendor capable of manufacturing same.

In general, the micropellets are comprised of agglomerated fine particles. More particularly, the micropellets mimic the granular characteristics and/or size of corn meal or corn grits. In one embodiment, a food-grade micropellet as described herein comprises an expandable starch-comprising component; and a plurality of fine particles agglomerated together with said expandable component, wherein said plurality of fine particles is derived from a non-starch source. In one embodiment, the micropellets consist entirely of fine particle components. Preferably, the micropellets comprise a starch-comprising component agglomerated with fine particles comprising a nutritive property or nutrients unlike that of corn meal. In some embodiments, the starch comprising components are present in varying concentrations of from between about 20% to about 40%, with the remainder comprising a non-starch powder component. The ratio of fine particle to starch ranges from about 1.5 to about 4. In one embodiment, the fine particle to starch ratio is about 60:40. In another embodiment, the fine particle to starch ratio is about 70:30. In another embodiment, the fine particle to starch ratio is about 80:20. In one embodiment, the fine particle to starch ratio ranges from about 60:40 to about 80:20.

Suitable starch-comprising components for agglomeration within the micropellet include without limitation corn, rice, and potato or products derived therefrom. Preferably, the starch-comprising component within the micropellet-containing formulation is one that gelatinizes upon cooking. Thus in one embodiment, the micropellets comprise a starch-comprising component selected from the group consisting of corn, rice, potato, a starch component derived from corn, rice, or potato, or any combination thereof. Such starch components may be modified or native. In one embodiment, the starch-comprising component comprises waxy corn starch. In one embodiment, the starch-comprising component comprises potato starch. In one embodiment, the starch-comprising component comprises corn meal. In one embodiment, the starch-comprising component is selected from the group consisting of the following: waxy corn starch, native corn starch, rice, tapioca, whole grain cereals, potato starch, or any combination or a starchy component thereof. In one embodiment, the starch-comprising component comprises Maltodextrin. In another embodiment, the starch-comprising component may be derived from the starch components of whole grain corn. Such components are widely available from any number of manufacturers.

Micropellet-containing formulations presented herein allow for the restriction and control of expansion in the production of snack food products. For example, when subjected to random extrusion, a micropellet will plasticize with the starch of a formulation introduced into the extruder. The micropellets will survive the shear in the random extrusion process, but expand as they exit the extruder die. It should be noted, however, that starches comprising low water binding capacities or low levels of amylopectin may not expand properly. For example, in embodiments comprising the introduction of fine particle proteins, the starch matrix of the micropellet should comprise a minimum of about 25% amylopectin for proper expansion. In addition, waxy starches may be more preferable than native starches, as waxy starches have been shown to have better expansion properties during trial runs when combined with high amounts of protein (i.e. 80%).

In one embodiment, the fine particle components of the micropellet are non-starch particles; meaning a substantial portion of the fine particles is comprised of a nutritive component other than starch or carbohydrates. Thus, in order to allow for varied nutritional content in a final food product, the fine particles comprise different nutritive properties or nutrients than those of the starch comprising components of the micropellet. For example, the fine particle components may comprise a component not derived from corn, while the starch-comprising component is corn meal; or the fine particle components may comprise a non-carbohydrate powder or flour. In one embodiment, micropellets of whole grain cereals may also be produced, wherein the expandable starch-comprising component comprises the starch of a seed and the plurality of fine particle components comprises the non-starch components, or remaining parts, of the seed.

In one embodiment, the fine particle component of the micropellet comprises protein. Any number of proteins may be incorporated, whether in concentrate or isolate forms, including without limitation dairy proteins such as milk protein isolate, soy protein isolate, pea flour isolate, casein, soy protein concentrate, seaweed proteins, legume-derived proteins, egg protein, lentil protein, fish hydroliside powder, wheat protein, any protein derived from animal, vegetable or marine source, protein derived from a plant seed such as a corn kernel, or any combination thereof. In one embodiment, the fine particles of the micropellets comprise between about 60% to about 80% protein.

While not all proteins may allow for continuous production of micropellets, it should be noted that batch portions of micropellets may also be manufactured. For example, in one embodiment, micropellets may comprise a whey protein isolate (WPI). WPI is often difficult to work with, as it typically produces a degree of stickiness that may hinder continuous production. However, WPI portions may be substituted with up to 50% SPI if necessary.

In another embodiment, the fine particle component of the micropellets comprises a mineral. In one embodiment, the fine particle component comprises calcium. Preferably, embodiments comprising an agglomerated mineral include maltodextrin as a binder to group together the fine particles. Micropellets comprising minerals may comprise, for example, a moisture content of about 8%. In one embodiment, the micropellet comprises agglomerated calcium powder having particle size dimensions close to cornmeal. During test runs, micropellet products comprising agglomerated calcium had a final moisture content of about 0.37% on a wet-weight basis, after one or more drying steps. In one embodiment, the calcium powder comprises from between about 35% to about 37.5% calcium. In one embodiment, the calcium powder comprises from between about 36.5% calcium, with the remaining balance being a starch around which the calcium particles agglomerate.

During test runs, several formulations of micropellets were successfully tested in the production of snack foods, the methods for which are further discussed below. In one embodiment, the micropellets comprise a corn starch and a milk protein isolate. In one embodiment, the corn starch is a waxy corn starch. In another embodiment, the corn starch is a native corn starch. In another embodiment, the micropellets comprise a milk protein isolate and a modified potato starch. In another embodiment, the micropellets comprise soy protein isolate with waxy corn starch at a ratio of between about 60:40 and about 70:30. In one embodiment, the micropellets comprise milk protein isolate with waxy corn starch at a ratio of between about 60:40 to about 70:30. In one embodiment, the micropellets may comprise milk protein isolate and potato starch at a ratio of between about 60:40 to about 70:30. Another embodiment of the micropellets may comprise about 60% starch or modified starch from any grain source and about 40% whey protein isolation. A further embodiment of the micropellet formulation may comprise about 85% whole grain flour, about 15% of a high amylose starch, and about 5% fiber such as inulin. An additional embodiment of the micropellet formulation comprises 100% whole-grain cereals.

In additional embodiments, the micropellets may also comprise microcrystalline cellulose (MCC) as a processing aid to help manage the moisture properties of the micropellet. MCC is a physiologically inert substance derived from a naturally occurring polymer, which compacts well under minimum compression pressures and has high binding capacity. When used in tableting procedures, it creates tablets that are extremely hard and stable, yet capable of disintegrating rapidly. MCC is particularly valuable as a filler and binder for formulations prepared by direct compression, however it may also be used in wet or dry granulation and for spheronization or pelletization. During wet extrusion, MCC binds the moisture and therefore, the wetted mass becomes rigid to be extruded. At the same time in the spheronization process, the extrudates are still brittle enough to break into small cylinders and simultaneously plastic enough to convert into pellets. In some embodiments, the micropellets comprise up to about 10% MCC.

The micropellets described herein may be made by a variety of agglomerations techniques so long as the process micropellets mimic the properties of corn meal. Preferably, the micropellets should comprise a high degree of cook (substantially 100%) and form a compacted structure. A preferred method that may be used to manufacture the micropellets is extrusion, which basically requires extruding material through a cooking extruder to pre-cook the materials in forming a dough followed by a forming extruder with a die and then cutting the resulting strands to form pellets of uniform shape and size. Pre-cooking is performed using either a single or twin screw (cooking) extruding, followed by a forming extruder, which forms the dough into spaghetti-type strands using a die head attached to a high rpm cutter. During some trial runs, micropellets were pre-cooked in a single screw extruder run with a low shear configuration designed for pellet production. A suitable forming extruder, for example, is a G55 cooking extruder manufactured by Pavan. The components of the micropellet are placed either manually or with the help of unloading equipment into supply hoppers. A mixture of dry fine ingredients and water-comprising liquids is premixed at high speed and is then cooked and extruded using an extrusion screw with modular sections and a jacketed cylinder with multiple cooking stages having independent temperatures. Comparable cooker extruders may also be employed. By way of example, a suitable forming extruder for the production of micropellets from pregelatinized raw materials is a F55 former-extruder known under the brand name Pavan. This extruder uses interchangeable dies and a cutting group. Pre-cooked mixtures of a homogenously hydrated and stabilized dough is formed using a compression screw, a cylinder with heating/cooling system, a headpiece and a die to form the product. Typically, a shaping die at the outlet of its downstream end, with a knife or knife cutting system located after the die. Formed spaghetti-type strands are cut into micropellets, collected via hopper and dried overnight in forced air convection and cooled in dryer temperatures of about 44° C. in a relative humidity of 66% for about 480 minutes drying time. Preferably, when introducing heat-labile components, low shear mixing occurs such that the mixing agitators and mixing speeds do not degrade or denature any proteins, flavors or other nutrients within the micropellet. These mixing components help to produce a uniform blend of ingredients with a dough-like consistency through a distributive zone of the extruder. Liquid inlets of the extruder ensure proper conditioning or moisture addition into the formulation. Shaping takes place in the extruder as the material is extruded through holes in the shaping die. In one embodiment, the die head comprises orifices of about 0.8 mm in diameter.

Wet extrusion and spheronization methods are also useful for formation of micropellets comprising heat-labile components because of the low shear involved. Thus in one embodiment, the micropellets are manufactured using the process of wet extrusion, followed by spheronization. As used herein, "spheronization" is used synonymously with the term "spheronizing," and is meant to refer to the rounding of moist, soft cylindrical pellets in a spheronizer. While these processes are known in the field of pharmaceuticals, the formulations described herein and the resulting micropellets are not. Briefly, the pre-mixed dry ingredients comprising a non-starch powder and a starch first undergo a mixing step wherein they are moistened with water or water-based solutions (such as a food grade solvent) and mixed in a high shear granulator or double planetary mixer to form a homogenous wet mass suitable for wet extrusion. Next, the wet mass is metered by a special feeder into a low shear extruder, such as a low shear dome or radial extruder, where it is continuously formed under into cylindrical extrudrates of uniform shape and size. The low shear ensures that the extruder temperature never reaches more than 80° F., protecting the heat-labile ingredients of the micropellets. Third, the wet extrudates, which comprise rod-like shapes are placed in a spheronizer where a gridded, fast spinning disc breaks them into smaller particles and rounds them over a period of about two minutes to form spheres. Fourth and finally, the wet spheres (also referred to as "beadlets") are dried. This process can be performed as either a batch or continuous operation with the above steps.

It should be noted that while in many cases it may be desirable to create micropellets capable of expansion, in some embodiments, micropellets having no expansion properties at all may be manufactured for inclusion into food products. For example, micropellets may be completely comprised of cellulose, which does not expand but can be included in snack products. However, when utilizing fine particles with no expansion capabilities, it may be desirable to mix or disperse non-expandable ingredients with at least 20% of a starch comprising component, or into a starch matrix, whether at least 20% starch is included within the micropellet or at least 20% starch is mixed with the micropellets prior to finish-product or food snack processing such as with a random extrusion die.

In one embodiment, the bulk density of the resulting micropellets ranges from between about 500 to about 700 g/l. Without being constrained by theory, it is believed that the particle size uniformity (size and density) of the micropellets ensure better mixing and less segregation in embodiments using a random extruder when compared to typical formulations used comprising corn meal.

In general, the micropellets may comprise a number of shapes. In one embodiment, the micropellets comprise a cylindrical shape. In another embodiment, the micropellets comprise a spherical shape. Micropellets should comprise a size of at least about 0.5 mm. In one embodiment, micropellets comprise a size of about 500 to about 700 microns (or about 0.5 mm to about 0.7 mm). In some embodiments, the micropellets comprise a size of about 500 microns (0.5 mm). In one embodiment, the micropellet agglomerates comprise a short length with a diameter of about 0.8 mm. In another embodiment, the micropellet agglomerates comprise a longer length of about 4 mm, with a diameter of about 0.8 mm. In one embodiment, the micropellets comprise a diameter of between about 0.5 mm to about 1.0 mm. In another embodiment, the micropellets comprise a diameter of between about 0.5 to about 0.8 mm. In one embodiment, the micropellets comprise a particle size distribution wherein at least 75% of the agglomerates are larger than 50 mesh. More preferably, at least 90% of the agglomerates are larger than 50 mesh. Most preferably, at least 99.9% of the agglomerates are larger than 50 mesh. Micropellets comprising smaller diameters are also possible in some embodiments; however, it may be preferable to pre-expand these prior to using the methods presented herein, as further discussed below.

Micropellet-Containing Formulations

The micropellets described herein are extremely versatile and allow for incorporation into a number of food processing methods or steps. Generally, a method of manufacturing snack food products comprises the steps of providing an expandable micropellet-containing formulation, said formulation comprising a plurality of discrete micropellets having fine particle components agglomerated therein; and cooking said formulation to form a snack food product. The plurality of discrete micropellets comprises a particle size distribution wherein at least 75% of the micropellets are larger than 50 mesh. Further, the micropellets are comprised of i) a starch-comprising component and ii) a plurality of fine particles having nutritional properties unlike that of the starch comprising food component.

In one embodiment, said expandable micropellet-containing formulation consists only of said plurality of discrete micropellets. In such embodiment, the method of manufacturing snack food products comprises the extruding of an expandable micropellet-containing formulation consisting of a plurality of the discrete micropellets through a random extruder.

In other embodiments, the expandable micropellet-containing formulation comprises less than 100% micropellets. In such embodiments, the micropellet-containing formulation comprises a plurality of discrete micropellets and a starch-comprising food component. Such micropellets may or may not comprise an expandable property. Where the formulation comprises less than 100% micropellets, the method of manufacturing snack food products comprises the steps of: combining a plurality of discrete micropellets together with a starch-comprising food component to form a micropellet-starch mixture, wherein said micropellets are comprised of i) a starch-comprising component and ii) a plurality of fine particles having nutritional properties unlike that of the starch comprising food component; and cooking the micropellet-starch mixture.

In one embodiment, micropellets are combined with unagglomerated granular starch comprising components and subsequently subjected to one or more cooking processes; in particular, unagglomerated particles derived from corn. In another embodiment, the micropellets are adhered or basted onto the surface of an unfinished food product (i.e., an intermediate food product no yet ready-to-yet) such as one that has undergone only a first cooking step. In one embodiment, the unfinished food product comprises an expanded collet having exited an extruder including without limitation a random collet. The micropellets may be basted or adhered onto the surface of expanded collet products and subsequently subjected to final cooking to cause further dehydration into a shelf stable, ready-to-eat snack food. In another embodiment, the micropellets are embedded within sheeted doughs, which are then subjected to cooking steps such as baking or frying.

When incorporated into formulations for direct expansion such as random extrusion, as further discussed below, the micropellet-containing formulations are able to sufficiently expand when exposed to sufficient amounts of heat, whether or not the expansion is due to a starch comprising component within the micropellet, or due to a starch comprising component with which the micropellets are combined. When incorporated into a random extruder, the micropellets plasticize such that they substantially blend into the matrix of the collets resulting from direct expansion processes.

In embodiments wherein the micropellets are adhered to the surface of snack food products, the micropellets expand upon cooking. The micropellets are capable of sufficient expansion even during short cooking processes and as such, may be introduced into a number of cooking lines in fairly high amounts that substantially improve upon the nutritional values of food snacks produced. Thus, in one embodiment, the micropellets may be incorporated into doughs during baking lines or processes. These methods are further discussed in detail below.

Random Extrusion

In order to better understand the limitations of the random extruder in terms of its typical formulations, and the benefits of one embodiment of the present method, the inner workings of the random extruder are first described.

Figure 2:
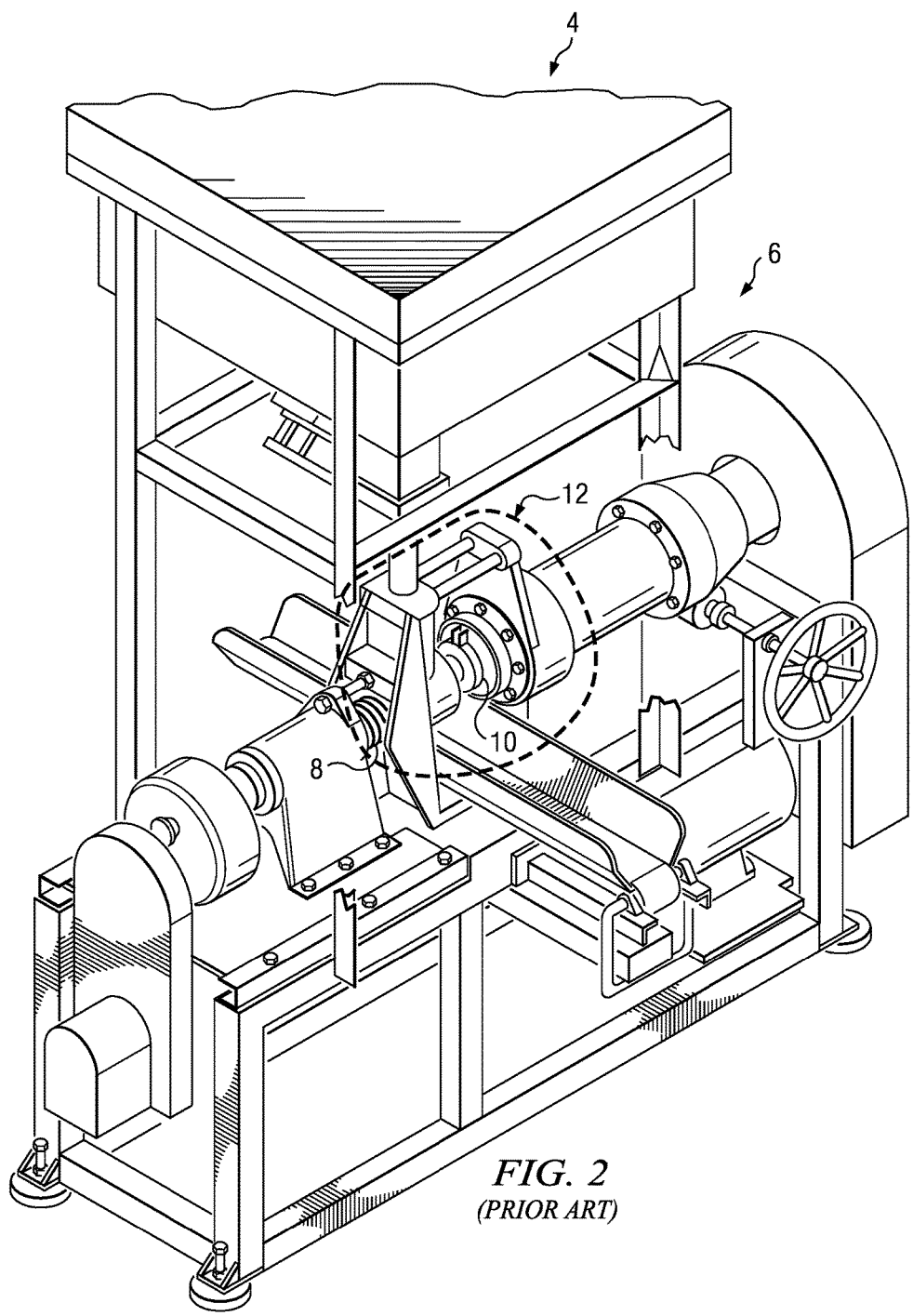
FIG. 2 depicts a perspective view of a random extruder used in manufacturing collets.

FIG. 2 illustrates a perspective view of a typical random extruder used for production of the random corn collets 2 depicted in FIG. 1. It should be noted that there are several manufacturers of the random extruder; however the fundamental design is very similar. Random extruders are high-shear, high-pressure machines, which generate heat in the form of friction in a relatively short length of time. No barrel heating is applied in random extruders, as the energy used to cook the extrudate is generated from viscous dissipation of mechanical energy.

Figure 3:
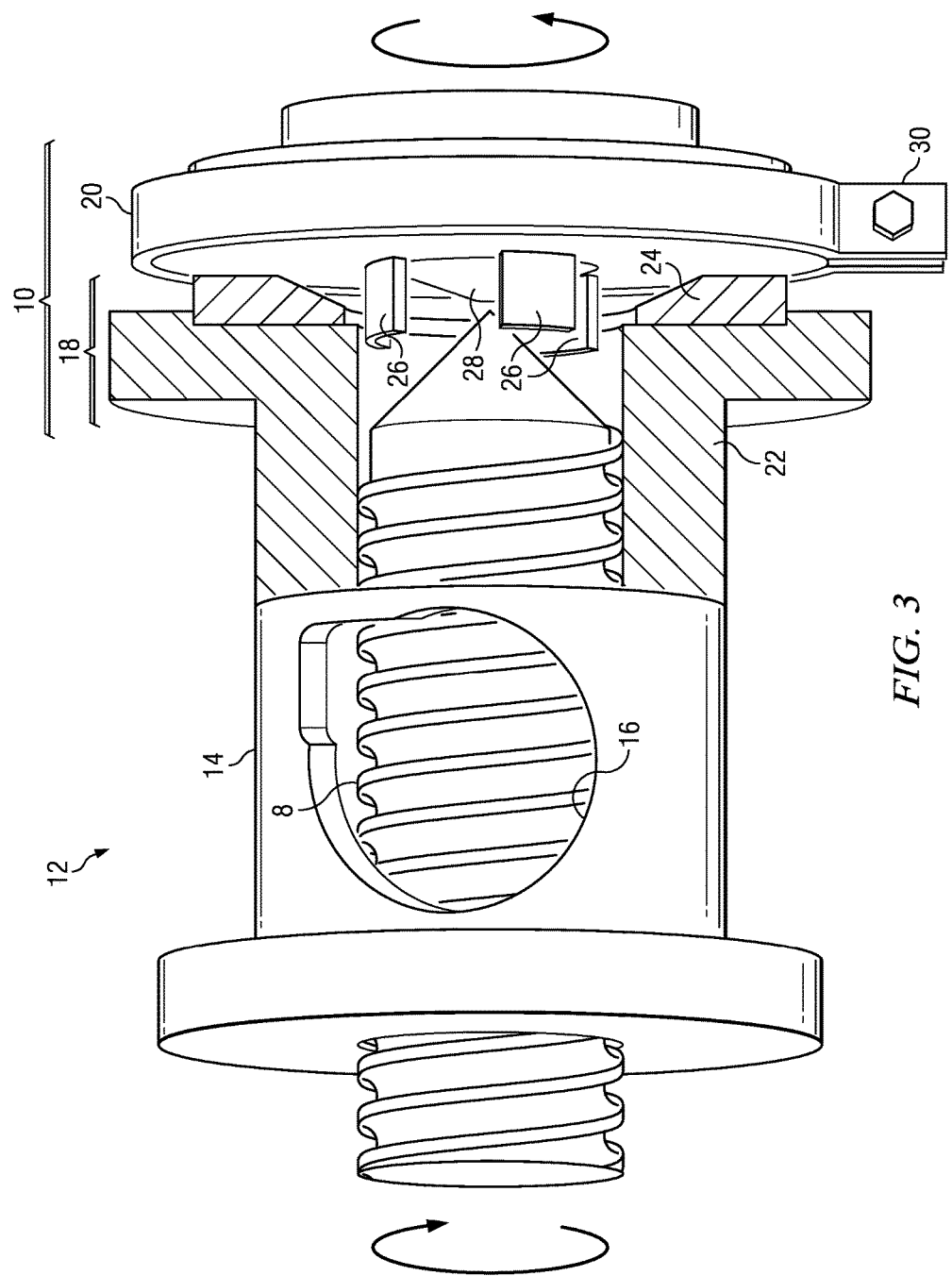
FIG. 3 depicts a close-up view of the main working components of the random extruder depicted in FIG. 2.

With reference to FIG. 2, pre-moistened cornmeal is gravity-fed through a hopper 4 and into the random extruder 6. In this manner, the extruder 6 is choke-fed, taking in all it can take. The random extruder 6 is comprised of two main working components: a single screw or auger 8 and a special die assembly (also known as a rotary die) 10 that gives the collets their twisted ("random") shapes. FIG. 3 illustrates a close up, more detailed image of the main working components 12 of the random extruder 6. The auger 8 is housed in a cylindrical casing, or barrel 14, and comprises an open feed section 16 through which the cornmeal passes, shown in FIG. 3. The auger 8 then transports and compresses the cornmeal, feeding it to the die assembly 10. Once the auger 8 conveys the material into the rotary die assembly, the working components grind and plasticize the formulation to a fluidized state in a glass transition process.

Figure 4:
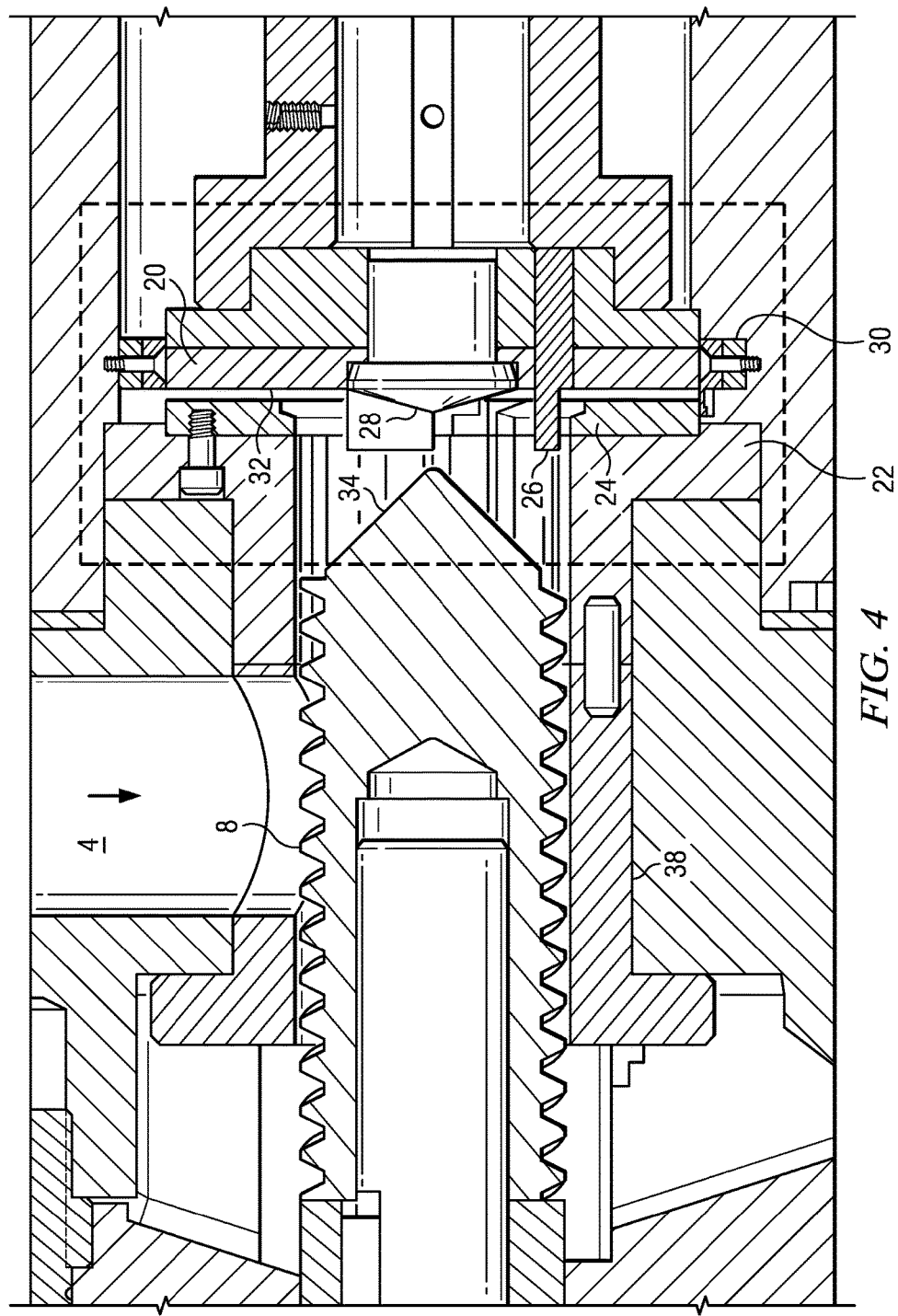
FIG. 4 depicts a detailed cross-sectional view of the main working components shown in FIG. 3.
Figure 5:
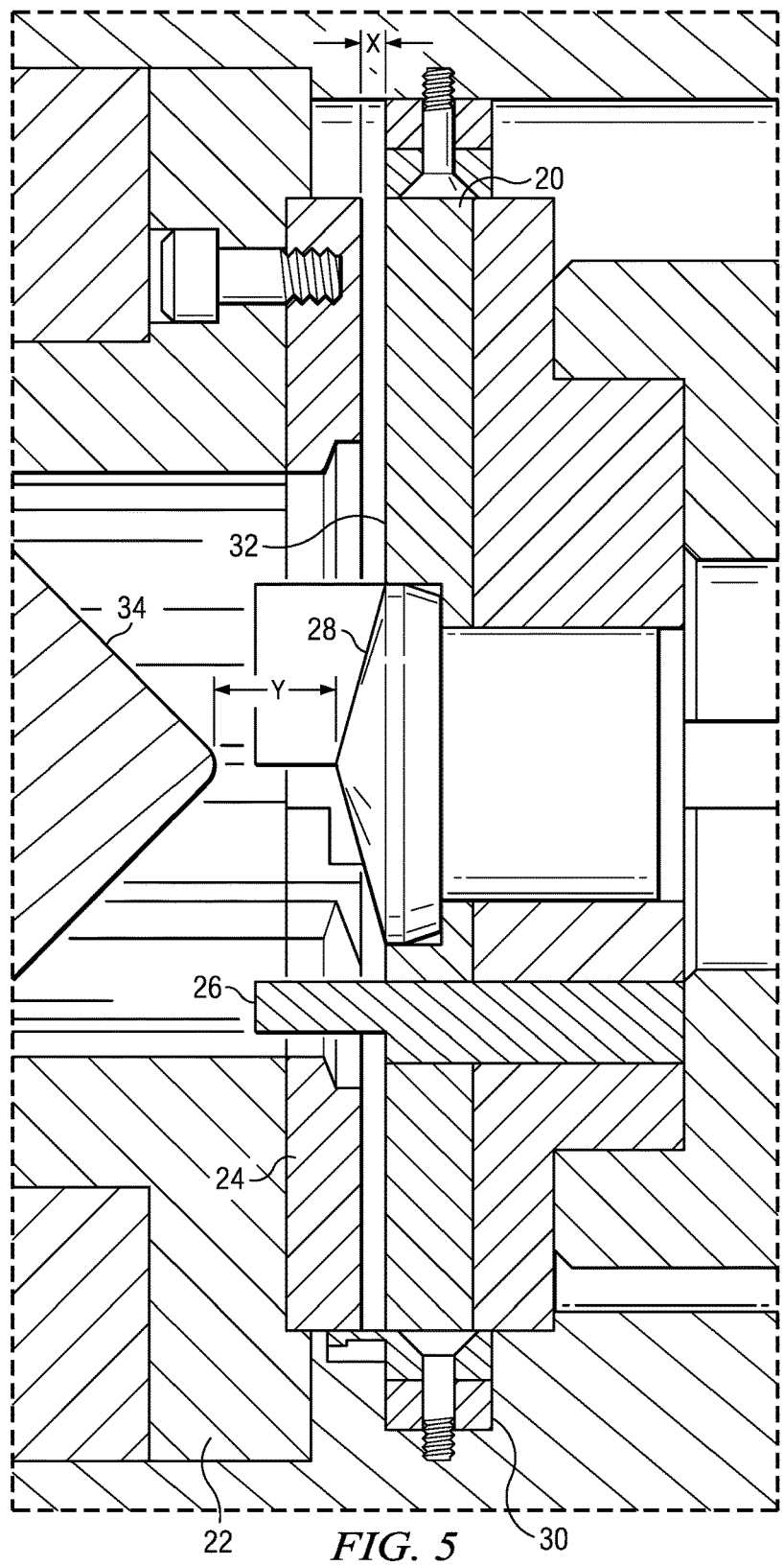
FIG. 5 depicts a close-up view of the area within the dashed lines of FIG. 4.

As best shown in FIGS. 3-5, the die assembly 10 is comprised of a stator 18 and a rotor 20. Gelatinization of moisturized starchy ingredients takes place inside the concentric cavity between these two brass plates 18, 20. The stator 18 is a round stationary brass plate that acts as a die through which the gelatinized melt flows. The stator 18 comprises a stator base section 22 and a stator head 24 with grooves (not depicted) that aid in the compression of cornmeal as the stator 18 works together with the rotor 20, which is a rotating plate comprising fingers (or blades) 26 and a nose cone 28. The nose cone 28 channels the cornmeal towards the fingers 26 and discharges the gelatinized cornmeal. The action of the fingers 26 creates the necessary condition of pressure and heat to achieve plasticization of the raw materials at approximately 260° F. (127° C.). Specifically, the fingers 26 force cornmeal back into the grooves (not shown) of the stator head 24, causing friction and compression of the cornmeal. The brass facing on the rotor 20 also helps to create heat and compression. Random extrusion may thus be characterized by a thermo mechanical transformation of the raw materials brought about by the metal to metal interactions of the main working components 12 in a random extruder.

Several things happen within the die assembly 10 during the random extrusion process. First, the corn meal is subjected to high shear rates and pressure that generate most of the heat to cook the corn. Thus, unlike other extruders, most of the cooking takes place in the special die assembly 10 of the random extruder. Second, a rapid pressure loss causes the superheated water in the corn mass to turn to steam, puffing the cooked corn. Third, the flow of corn between one rotating plate 20 and one stationary plate 18 twists the expanding corn leaving it twisted and collapsed in places, resulting in the product characteristic shape shown in FIG. 1. Cutter blades within a cutter assembly 30 then cut off the collets 2 that result from the expansion process of the stator-rotor interactions. The process is entirely unique, providing unsystematic, irregularly shaped collets and a texture distinct in its crunchiness.

As discussed above, it is known and accepted in the industry that random extruders require uniform granulation to be able to generate the high frictional energy necessary to produce the snack product and its desirable crunchy texture. Thus, to date, the inclusion of ingredients other than refined cornmeal has proved extremely challenging, especially for mass production processes. While other extruders may provide more flexibility in terms of the components introduced therein, only random extruders can create the random collet 2, which upon exit from the random extruder, comprises a bulk density of ranging from between about 3.0 to about 6.0 lbs/cu ft. or more preferably between about 4.0 to about 5.50 lbs./cu ft. Twin screw extruders (TSE), for example, are less dependent upon frictional properties as they provide for a positive displacement transport with the intermeshing of rotating twin screws. Thus, TSEs are more flexible due to their conveying mode and mixing characteristics. However, these extruders typically produce a different variety of collet; namely, corn puffs comprising a relatively smoother surface and a more rod-like cylindrical shape with a lighter density. By way of example, upon exiting from an extruder corn puffs produced from a TSE typically comprise a bulk density ranging from between about 1.8 to about 2.8 lbs/cu ft, depending on size. Thus, while the TSE has better conveying and pumping capabilities, and therefore greater flexibility for formula variation, TSE is still not capable of producing the denser random collet.

The conveyance through the auger is an important factor of the random extrusion process. The method as described herein focuses upon and facilitates this conveyance, while introducing different components than ever before successfully used. Specifically, by taking advantage of agglomeration and/or pelletization technologies and methods, the micropellets are able to emulate the particle size of the corn meal traditionally used in the random extruder to improve upon the conveyance performance through the auger of the random extruder when incorporating other non-carbohydrate powders as a raw material. Thus, it has been found that uniformity of particle sizes provided by the micropellets will facilitate conveyance through the auger and ensure good and continuous random extrusion. The plasticization of the micropellet and its formulation or blend also helps overcome the limited mixing properties of the random extruder. In addition, certain improvements to the metallurgy of the extruder itself provided also ensure continuous extrusion and proper expansion.

Micropellets within Random Collets

One embodiment for manufacturing snack food relates to micropellet-containing formulations for the introduction into a random extruder. As described above, applicants have found that by using micropellets capable of mimicking corn grits, random collets comprising a nutritional content different from that of traditional collets may be produced. Suitable micropellet-containing formulations properly expand and completely plasticize without leaving visible residue or remaining pieces of the micropellet in the final product. Consequently, in a first aspect, the micropellets are introduced into and extruded using a random extruder, which otherwise fails or locks up when fine particles, powdered or granular materials are introduced because the single auger cannot generate a uniform flow.

Figure 6:
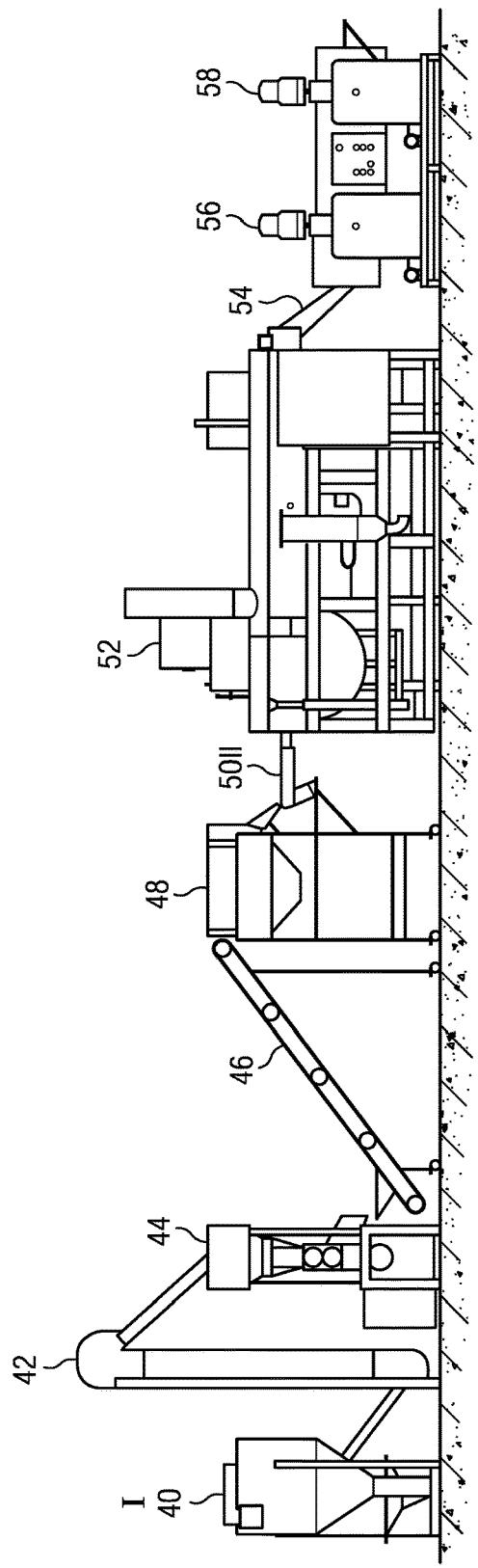
FIG. 6 depicts a typical overall random extrusion line process.

FIG. 6 depicts a traditional random extrusion process for producing fried corn collets from start to finish and serves to illustrate one embodiment, which will be further described in detail below. First, reference numeral I indicates one embodiment wherein the micropellets may be introduced into a random extruder. Second, reference numeral II indicates another embodiment wherein the micropellets are introduced just prior to the final cooking step of a collet. While FIG. 6 describes a process for producing fried random corn collets, it should be noted that such illustration is not meant to limit the scope of this embodiment. That is to say, micropellets may be used for the production of a variety of snack foods, including fried or baked collets.

Briefly, as shown in FIG. 6, in a first step of a random extrusion line, a mixer 40 adds moisture as it mixes the raw materials. The mixer may be vertical, as depicted in FIG. 6, or horizontal (not pictured). The raw materials are then transferred to a bucket elevator 42, which elevates the materials to the extruder hopper of the random extruder (also depicted in FIG. 2). Next, extrusion 44 forms hard dense extruded product utilizing rotating brass plates, as previously discussed above with reference to FIGS. 2-5. The product is then conveyed 46 to a fines tumbler 48, which removes small fines from the product. The product then passes through a vibratory feeder 50 to provide even feed to a fryer 52, such as a rotary fryer, which decreases moisture and adds oil to the extruded product. Next, an additional vibratory feeder 54 transfers product to a coating tumbler 56, wherein oil, flavor and salt are mixed. The products can then be turned in a flavor drum 58, wherein flavor is applied to the surface of the collets 2. This extrusion process is unique because each resulting collet 2, best shown in FIG. 1, is somewhat varied in length and diameter, giving somewhat of a home-made effect. Embodiments introducing a plurality of micropellets will now be described.

In the formation of random collets, the method may comprise the steps of: introducing into the random extruder an expandable mixture comprising a plurality of micropellets, said micropellets having fine particle components agglomerated therein; and extruding the mixture of micropellets through the random extruder. With reference to FIG. 6, the mixture comprising a plurality of micropellets may be introduced at numeral I.

In one embodiment, the micropellets comprise at least 60% of said fine particle components. The fine particle components may comprise one or more of the group consisting of protein, mineral, vitamin, fiber, fruit, vegetable, grain, meat, and any non-starch derivative. In one embodiment, the fine particle components comprise a protein selected from the group consisting of milk protein isolate, soy protein isolate, and whey protein isolate, or any combination thereof. In one embodiment, the fine particle components comprise a protein derived from the group consisting of animal, plant or marine source, or any combination thereof. The micropellets may comprise a bulk density of between about 500 g/L to about 700 g/L. In one embodiment, the micropellets comprise up to about 10% microcrystalline cellulose.

In one embodiment, the mixture comprising said plurality of micropellets further comprises an expandable starch component. For example, micropellets and starch may be added, either consecutively or simultaneously, directly into a blender at step 40 or through the feed section 16 of a random extruder (shown in FIG. 3). As briefly described above, the micropellet-containing formulation may comprise a starch-comprising component combined with the micropellets. In one embodiment, the starch-comprising component comprises unagglomerated, loose starch particles. Such unagglomerated, loose particles may comprise corn meal. In another embodiment, the starch particles comprise corn grits. Corn products suitable for use with the random extrusion processes are commercially available from any number of manufacturers, and would include, for example, any corn-derived product. In one embodiment, the mixture may comprise an expandable starch component selected from the group consisting of corn, potato, rice, and tapioca.

In one embodiment, the unagglomerated starch particles comprise a particle size distribution wherein between about 30% to about 65% of said particles fall between 500 to about 700 microns. In one embodiment, the unagglomerated starch particles comprise a particle size distribution wherein about 30% to about 50% of the particles are about 500 microns. In another embodiment, the starch particles comprise a particle size distribution wherein about 40% to about 65% of the particles are about 500 microns.

The ratio of micropellets to starch-comprising component in the micropellet-containing mixture may vary, depending upon the amount of starch agglomerated within the micropellets and the desired level of expansion. In general, the higher the amount of starch in the overall micropellet-starch mixture, the more expansion achieved. As stated above, micropellet-containing formulations should comprise at least 20% of a high amylose starch. On the other hand, higher amounts of the non-starch fine particle components provide for more significant variations of the nutrients of the resulting collet. With sufficient amounts of starch within the micropellets, micropellet-containing formulations comprising substantially 100% micropellets, or consisting entirely of micropellets, may be cooked within a random extruder without the starch-comprising component.

In one embodiment, a micropellet-starch mixture may comprise from between about 0.25% to about 2.5% of mineral micropellets, with the remaining balance of the mixture comprising unagglomerated starch particles such as corn meal. In one embodiment, mineral micropellets constitute calcium micropellets comprising 90% calcium ingredient such as calcium carbonate and 10% a binding or agglomerating component such as starch. For example, during test runs, micropellet-containing formulations comprising approximately 2% agglomerated calcium and approximately 98% yellow corn meal were successfully extruded using random extruders. Despite the relative low quantities required in formulations to achieve nutritional targets, the reactivity and fine particle size of most minerals make their extrusion processing especially difficult unless formulated into micropellets as disclosed herein.

In embodiments comprising protein micropellets, suitable formulations of the micropellet-containing formulation comprise at least 15% protein micropellets. In one embodiment, the micropellet-containing formulation comprises at least 40% protein micropellets. In one embodiment, the micropellet-containing formulation comprises from between about 15% protein micropellets to about 41% protein micropellets. In one embodiment, a protein micropellet-containing formulation comprises about 20% protein micropellets comprising a milk protein isolate, with the remainder comprising a corn meal. In one embodiment a protein micropellet-containing formulation comprises between about 19% and about 21% of a micropellet comprising a milk protein isolate.

In other embodiments, a combination of various micropellets may be incorporated into the micropellet-containing formulation or into a micropellet-starch mixture. For example, a micropellet-starch mixture may comprise one or more of rice micropellets, porphyra micropellets, tapioca micropellets, milk protein isolate micropellets or soy micropellets.

The metallurgy of the random extruder is believed to influence expansion of the micropellets, in particular when using formulations comprising high amounts of protein. With reference to FIGS. 3-5, in order to reduce biopolymer film formation on the rotor 20 observed in several random extrusion runs using high protein micropellets, the bronze rotor plate 20 was substituted with one made of stainless steel. Results demonstrated substantial elimination of film formation with improved process stability. Consequently, in one embodiment, extrusion is performed using a rotor plate 20 comprised of stainless steel. During test runs further described below, formulas containing milk protein isolate were used to prove that the change in metallurgy had a positive effect on expansion and helped achieve continuous production of the nutritional collets, allowing for inclusions of high amounts of protein micropellets.

Returning to the discussion of FIG. 6, another reason for the instabilities in the process when introducing non-traditional, non-corn formulations is the type of mixer 40 used to blend the corn meal with water. The vertical mixer 40, which is typically used, requires long mixing times in order to raise the moisture up to about 16% or about 17%. This process is very inefficient when using non-traditional corn meal formulations with anything smaller in size, such as flours. Fine particles or powders have a greater surface than the corn meal. As such, when introducing these smaller components, the more hygroscopic fines compete with the corn meal for water. Essentially, when water is applied in the vertical mixer, the finer particles pick up moisture faster than those of the larger (corn meal) particles. When too much powder is present, the fines pick up the moisture faster than the rest of the mix, the corn meal. The finer powders or flours not only pick up the moisture faster, but also form clumps that become a source of instability in the extruder because of the moisture disparity between the corn meal and flour. These clumps build up a mud-like film on the rotor and stator, which acts as lubricant in the special die assembly of the random extruder and causes the extruder to choke, interrupting production. Thus, surface moistures are believed to contribute to random extruder lockup, halting production when a film is formed on the face of the rotor 32.

Even when using the micropellets, in some embodiments comprising high amounts of proteins, for example, surface moisture should be avoided in order to ensure continuous, uninterrupted production. Consequently, in one embodiment, the method further comprises pre-hydrating the plurality of micropellets and the starch-comprising component. In one embodiment, the method comprises the step of separately pre-hydrating said plurality of discrete micropellets prior to providing said micropellet-containing formulation. In one embodiment, the micropellets are pre-hydrated prior to combination with a starch-based component to a moisture level of about 16.5%. A pre-hydrating step may take place prior to the combining of the micropellets and unagglomerated starch comprising particles (i.e., prior to the step of providing of said micropellet-containing formulation) such that said micropellet and starch components are pre-hydrated as separated entities. The starch-based food product to be combined with the micropellets thus comprises hydrated corn meal. In one embodiment, corn meal is pre-hydrated to a moisture content of between about 18% to about 25% when used as a premix with micropellets of proteins, fibers, fruits and/or veggies. In one embodiment, the micropellets are pre-hydrated, separately from the corn meal, to a moisture content of between about 7% to about 15%. In one embodiment, the micropellets are pre-hydrated and allowed to equilibrate for at least 6 hours prior to combination with the corn meal. In another embodiment, micropellets at their shelf-stable moisture content are blended with the rest of the formulation only after all necessary liquid to achieve target 16-17% moisture content of the formulation has been separately added to the corn meal or similar starch-comprising component of the formulation. The final blend is allowed to equilibrate for about 3 to about 6 hours. Pre-hydration can also be done by any means that allows for moisture intake into the components, including without limitation a steam chamber with mixing action as a pre-conditioner, water or water-based solutions, heated water in a mixer, and under pressure. In one embodiment, the micropellets and corn meal may be pre-hydrated together in a tempering process comprising the steps of mixing and water application. In one embodiment, the micropellet-containing formulation comprises between about 15% to about 70% hydrated corn meal. In one embodiment, the micropellet-containing formulation comprises between about 30% to about 75% hydrated micropellets.

Alternatively, the method may further comprise the step of combining the micropellets and starch comprising component in a pre-hydrating step, wherein the micropellets and starch are combined and pre-hydrated together for a sufficient time to allow for moisture equilibration in a tempering process prior to their introduction into the random extruder. Generally, the two should be prehydrated for a minimum of three hours to reach equilibrium. In some embodiments, pre-hydration steps may be preferable when using embodiments wherein the micropellets comprise protein in order to achieve desirable levels of expansion. When using mineral micropellets, because of their relative lower proportion to the total formulation, pre-hydration can be accomplished by pre-blending the mineral micropellet with the rest of the formulation for between about 5 to about 10 minutes, and adding water or other food liquids while blending for additional approximate 5 to 10 minutes to achieve 16-17% moisture content.

In order to ensure desirable expansion of the micropellet-containing formulation, the moisture content within the random extruder should be adjusted. Preferably, the moisture content within the random extruder should not exceed 17% in order to achieve favorable expansion of the nutritional collets. In one embodiment, the micropellet-starch mixtures is extruded at a moisture content of between about 15% to about 17% within the random extruder. During some test runs incorporating protein micropellets, it was observed that residues of unexpanded, partially plasticized micropellets or blister-like inclusions in the collet matrix appeared when neglecting moisture content. This is believed to indicate that expansion started but stopped most likely due to lack of enough moisture, or problems with the total moisture content necessary to achieve expansion. Well-expanded random collets should show micropellet expansion and a fairly consistent cell structure, similar to those of the traditional random collets with no "crater-like" inclusions where unexpanded micropellets may be embedded.

In an alternate embodiment to prevent film formation and ensure continuous production of random collets, the micropellets may be pre-cooked. Without being bound by theory, it is believed that pre-cooking helps to prevent any slippage or lubricant-like effects on the rotor or stator (i.e., loss of friction in the die assembly) by increasing the resistance of the micropellets in the mixture to the shear forces in the stator. In addition, in embodiments using smaller micropellets, pre-cooking may result in desirable puffing or expansion to more desirable, larger sizes. Pre-cooking steps may comprise, for example, roasting, baking and/or microwaving the micropellets prior to their combining with the starch component for extrusion. Micropellets may be pre-cooked or pre-expanded to achieve a moisture content of about 8-10% below the original moisture content of 11% to reduce plasticity. Preferably, the reduction of moisture is performed using low temperatures in overnight processes. For example, micropellets may be baked/roasted/microwaved at temperatures of about between about 70° to about 90° C. for about 12 hours. In one embodiment, expandable micropellets comprising a particle size of less than about 0.8 mm in diameter undergo a puffing step prior to the step of combining with a starch for extrusion. In another embodiment, protein micropellets to be pre-cooked have a particle diameter less than between about 0.3 mm to about 0.8 mm. Pre-cooking micropellets of this smaller size allows for their expansion into puffed micropellets having a larger particle size similar to that of the unagglomerated starch particles with which the micropellets are combined prior to extrusion. Alternatively, micropellets comprising a particle size of about 0.8 mm may be roasted with minimal expansion to attain a moisture content of about 8% to about 10%.

In a further embodiment, the components within the micropellet may also be pre-cooked so as to reduce water or binding affinities. The pre-cooking process may involve any process by which a powder or starch component is subjected to alter its physicochemical properties including without limitation fluidized bed and high temperature-short time extruders such as, for example, cooking and forming extruders, or high shear extruders. Altered powder or starch components are thereafter agglomerated using any method known in the art.

Figure 7:
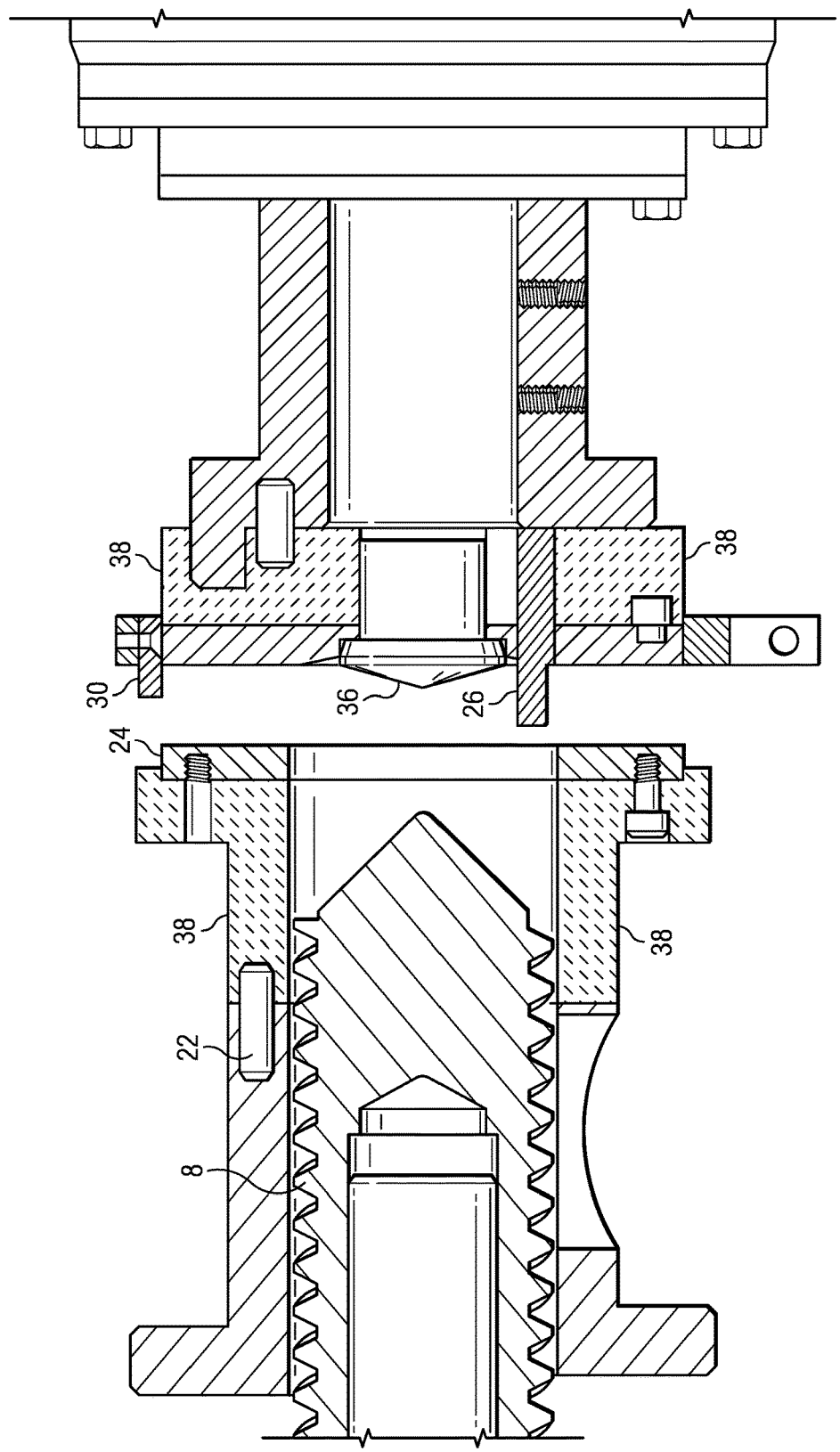
FIG. 7 depicts one embodiment of the improvements to the random extruder.

In further reducing any process instabilities stemming from difficult, less traditional formulations for random extrusion, Applicants have further found that colder temperature may contribute to improved coefficients of friction in the rotor, reducing slippage and improving the drag flow of biopolymers. Accordingly, the random extruder may be fitted with a temperature control device to help reduce process instability when handling micropellets comprising heat-sensitive materials such as proteins and fibers. Preferably, the work zone of a random extruder comprises a cooling device to cool the work zone. In one embodiment, the rotor of the random extruder comprises a cooling device or a cooling system. In another embodiment, the stator comprises a cooling system. In another embodiment, depicted in FIG. 7, a random extruder comprises a cooling system 38 adjacent or attached to both the stator head 24 as well as the rotor plate 20. The cooling system may comprise any device or means of cooling the work zone including without limitation a chill water jacket housing or water stream. One skilled in the art should recognize methods of incorporating such a cooling system. For example, a recirculation of chill water in a honeycomb area of the last section of the random extruder, in the stator zone, or downstream of the stator, could be created. In one embodiment, the cooling system circulates a water bath to help dissipate the thermal heat generated by the frictional impact of the extrusion process. To improve the coefficient of friction and drag flow, the temperature of the die assembly should comprise a range of between about 260° F. to about 275° F. Such lower temperatures (as compared to typical random extrusion processes with a range of between about 290° F. and about 300° F.) reduce slippage, resulting in a self-cleaning-type process during extrusion. In addition, the lower temperatures achieve steady state conditions necessary for continuous production and better product uniformity and flexibility.

Figure 8:
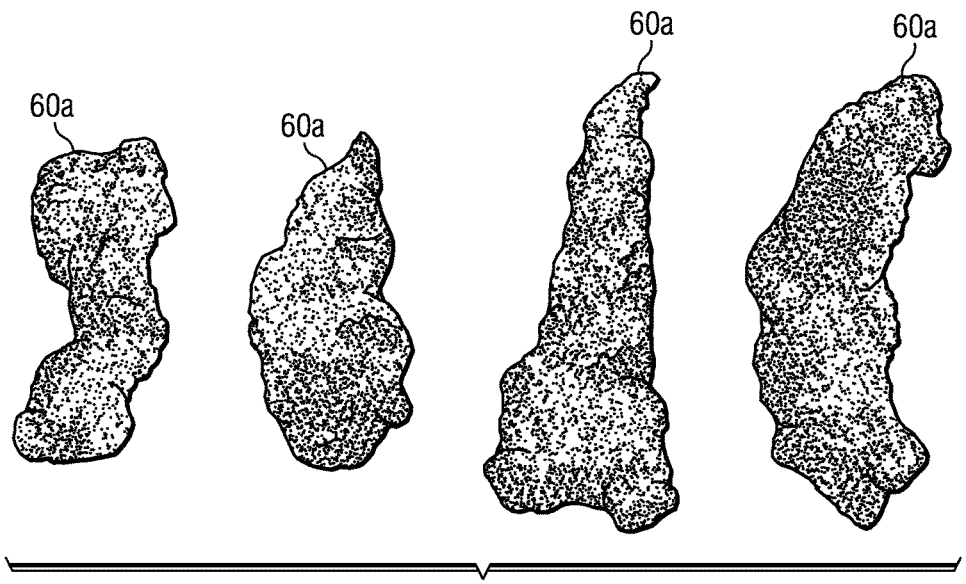
FIG. 8 depicts a plurality of random collets made according to a first aspect.

FIG. 8 depicts random collets 60a produced with micropellets comprised of soy protein isolate and waxy corn starch and seasoned using cheddar seasonings. The micropellets used comprised a maximum size of about 0.8 mm. The collets 60a comprise about 5 grams of protein per one ounce serving, with unique and random shapes. While it is difficult to depict in illustrating the resulting collets, the resulting collet matrix showed that the micropellets totally melted into the matrix. In addition, the flavor of the soy protein isolate and waxy starch-micropellet mix was not perceived in the cooked base.

Figure 9:
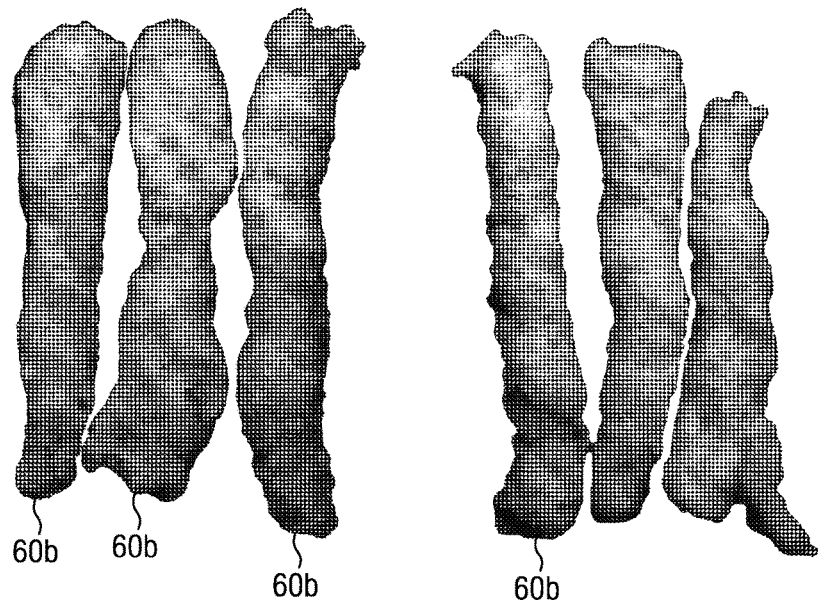
FIG. 9 depicts a plurality of random collets made according to a second aspect.

Similarly, FIG. 9 depicts random collets 60b and 60c produced with micropellets comprising milk protein isolate and waxy corn starch. Collets 60b comprise 5 grams of protein and collets 60c comprise 10 grams of protein. Both comprise the unique random shapes substantially similar to those collets 2 of traditional corn meal formulations as shown in FIG. 1. It should be noted that these collets as depicted in FIG. 9 have been cooked via expansion in the extruder, but have not yet undergone cooking or optional seasoning steps.

Micropellets Adhered onto Collets

In another embodiment, a plurality of micropellets can be combined together with a starch-comprising component to form a micropellet-containing formulation, wherein the starch-comprising component is an expanded collet, and thereafter subjecting the micropellet-containing formulation to a final cooking step. As described above with reference back to FIG. 6, reference numeral II provides one example at which micropellets might be combined in accordance with one embodiment. Said combining comprises an adhering or basting step, wherein the micropellets are basted onto the surface of expanded collets. Preferably, a biopolymer such as starch or protein can be used as a base emulsion externally or basted onto the surface of the collets. For example, during trial runs, 3% by weight of carboxymethyl cellulose was basted onto random collets using a spray bottle. In one embodiment, one or more starch media binders may be used for topical application or coating onto the collets prior to combining with micropellets. Suitable binders include for example corn modified starch manufactured by NTAC™, surface binders such as carboxymethyl cellulose, fiber binders, starch binders, protein binders, gels, sugars, combinations of sugars and water, gums or any food grade binder, or any combination thereof. Starch binders may further comprise protein powder, fiber, powdered nuts, or any combination thereof. Starch binders are preferred in embodiments wherein it is desired to add a secondary textural experience, or double crunch.

After the basting process, collets can be sprinkled with micropellets, which adhere to the surface of the basted collets. In one embodiment, the collets are sprinkled with pre-cooked or pre-puffed micropellets. Micropellets may be pre-puffed in some embodiments using for example air puffing, microwaving or baking to heat the micropellets to a temperature of about 350° F. Immediately after the combining of the micropellets to the surface of basted collets II, with reference to FIG. 6, the basted collets are subjected to a heating process wherein the binder matrix is set, tightly binding the micropellets. In FIG. 6, such heating process depicted is a frying step 52. However, such heating process may also include for example baking or other cooking processes that cause the micropellets to expand and/or set.

FIG. 10 depicts an illustration of collets 62 resulting from basting processes as described herein, having micropellets 64 basted thereon. Any of the expandable micropellets as described above may be basted onto an expanded collet 62 to vary the nutritional content of a collet. In one embodiment, the micropellets are basted or adhered onto a traditional random collet 2, such as those depicted and described with reference to FIG. 1. In another embodiment, the micropellets are basted or adhered onto the surface of nutritional random collets as manufactured in the first embodiment described above (shown for example in FIGS. 9 and 10), wherein micropellets have been included within the matrix of the collets. Thus, it should be understood that the micropellets can be adhered to any expanded collet-type snack food product as described herein, before final dehydration or cooking steps including baking or frying.

Micropellets within Baked Dough Products

In a final embodiment, micropellets as described herein are also useful in snack food embodiments comprising sheetable or sheeted doughs; namely, the micropellets may be embedded within doughs during sheeting steps and prior to cutting and baking steps. Thus, a plurality of discrete micropellets can be combined together with a starch-comprising component in the form of a starch-based dough to form a micropellet-containing formulation. Thereafter, the micropellet-containing formulation may be subjected to a cooking step such as baking or frying. Preferably, micropellets are distributed onto the dough and lightly embedded within the dough during or following a sheeting process. The dough comprising micropellets can subsequently be heated to cause expansion of the micropellets within the dough. Subsequent baking or drying with heat should ensure expansion into the dough. Thus, the micropellets may be used in baked products and/or baked processing lines for the production of a number of snack foods including without limitation pretzels, crackers, cookies, and bagel chips. By way of illustration, micropellets may be used in Reading Bakery Systems (RBS). RBS provide platforms for a number of different products. In general, RBS comprise the steps of mixing and dough forming, followed by baking and drying. Dried products may then be packaged and distributed or sold to consumers.

Dough formulations may be mixed by batch or continuous processes such as through a continuous mixer. The dough is then transported for formation or shaping, which may include without limitation sheeting or low pressure extrusion. Shaping may be performed using a roll sheeter such as a 2- or 4-roll sheeter. Micropellets may be added onto doughs during sheeting steps, wherein the micropellets are combined with the dough just prior to passing through the last set of rollers to insert the micropellets into the dough. Briefly, when using a 2-roll sheeter, dough is transferred into a hopper mounted over rolls that rotate toward one another, which draw the rolls through them to form a single sheet. When using a 4-roll sheeter, micropellet-containing dough formulations may be fed into a sheeting system comprising upper and lowers sets of rolls. Moisture content of the micropellet-containing dough formulations comprises a level of about 16.5% to ensure expansion of the micropellets in the dough. The thickness of the sheet for a dough containing micropellets may range from about 2 mm to about 3 mm. A rotary cutting station may then cut and shape the product, followed by seasoning and baking steps. Preferably, baking is a short process lasting about 10 minutes and using temperatures of about 350° F. to allow FIG. 11A depicts an expanded snack food with expandable micropellets comprising sea vegetable protein, wherein the expanded micropellets are visibly apparent within the snack food as darkened portions of the food product. FIG. 11B depicts a snack food product made by imbedding micropellets within a dough starch matrix. To the left, the product is shown after having imbedded the micropellets into the dough. To the right, the product is shown after expansion in an oven. Similarly, FIG. 11C depicts a snack food made by imbedding micropellets within a dough, both before expansion (on the left) and after expansion (on the right).

The invention will now be further elucidated with reference to the following examples, which should be understood to be non-limitative. It should be appreciated by those of ordinary skill in the art that the techniques disclosed in the examples that follow represent ones discovered by the inventors to function well in the practice of the invention and thus, constitute exemplary modes. One of ordinary skill in the art, when armed with this disclosure, should appreciate that many changes can be made in the specific embodiments while still obtaining similar or like results without departing from the spirit and scope of the present invention.

EXAMPLE 1

Milk Protein Micropellet Formation

Micropellets were prepared using milk protein isolate (MPI) protein for the production of random collets. Micropellets were produced on a Pavan extrusion line consisting of a single screw extruder (G-55 Extruder) and the forming extruder (F55), as discussed above. The material was cooked and then fed into the forming extrusion line to form the dough. A die comprising multiple orifices with a diameter of about 0.8 mm was used together with the high speed cutter to obtain the desired product shape. Cut micropellets were collected via a hopper and dried overnight in a forced air convection oven.

The micropellets were produced using three different protein levels of protein to starch ratios: 60:40; 70:30; and 80:20. Different starches were also tested with the MPI. First, MPI was run together with a resistant starch, under the brand name ActiStar manufactured by Cargill). However, this combination led to very poor expansion of the micropellets and therefore, further starches were run. In a second run, MPI was agglomerated together with a native corn starch at levels of about 60:40, about 70:30 and about 80:20. An acceptable amount of expansion was achieved.

Additional formulations of MPI were run using (1) a native potato starch (manufactured by Fecola), (2) a waxy starch (manufactured by Roquette), and (3) phosphorylated starch (modified corn starch manufactured by Paselli). Following formation of the micropellets, the expansion of the micropellets was evaluated. The waxy starch showed the best expansion upon frying, followed by the phosphorylated starch and then the native corn starch. Test runs also showed that the levels of starch may play an important role in expansion, with increased expansion demonstrated at higher levels of starch.

EXAMPLE 2

Soy Protein Micropellet Formation

Micropellets of soy protein isolate (SPI) were also manufactured and tested for suitable expansion properties. SPI micropellets were manufactured with extrusion methods using (1) native corn starch and (2) waxy corn starch at levels of about 60:40 and about 70:30. The moisture within the random extruder was measured to about 17.5% with an auger speed of about 130 rpm and a rotor speed of about 650 rpm. Better expansion was seen with the SPI:waxy corn starch micropellets upon frying. It was observed that higher levels of starch lead to more expansion upon frying.

EXAMPLE 3

Whey Protein Micropellet Formation

Micropellets of whey protein isolate (WPI) together with native potato starch were also manufactured and evaluated. However, the WPI mixtures were not easily extruded for forming into the micropellets and the materials had already caked in the pre-conditioning steps, forming very sticky doughs. To mitigate the stickiness, about 50% of the WPI was substituted with SPI in a protein to starch ratio of about 60:40 (with the protein fraction composed of about 50% WPI and about 50% SPI. This reduced the stickiness and produced suitable micropellets, however the product rate was substantially slower due to the poor wetting properties of WPI. It is believed that instantized WPI may be a more suitable protein for formation of micropellets with subsequent expansion.

EXAMPLE 4

Calcium Micropellets into Random Collets

During several test runs, particles of calcium were agglomerated and run through the random extruder. The table below contains data for the particle size of the calcium carbonate agglomerations used during these trial runs for inclusion of calcium into random collets.

TABLE 3

Particle Size of Calcium Carbonate Agglomeration

| Particle Size | % retained/passed |
|---|---|
| +16 mesh | 0.0 |
| +60 mesh | 66.5 |
| −200 mesh | 1.5 |

These micropellet agglomerates were comprised a moisture content of about 0.37% by weight on a wet basis. The agglomerates comprised a starch-based nucleus; in particular, maltodextrin was used to agglomerate the particles at a moisture content of about 8% by weight. White agglomerates of calcium further comprised about 36.5% calcium.

During test runs, about 861 grams of the calcium carbonate agglomeration was added to about 100 pounds of yellow corn meal. About two liters of water was added to the dry mix of calcium and corn meal, with an in-barrel moisture content of about 15.7%. The rotor position or gap was set to about 1.94 mm, and the stator head temperature was recorded to be about 145° C. The auger speed was initially set to about 142 rpm. All test runs with this agglomeration comprised a rotor speed of about 501.50 rpm. Product rate was measured to be about 7.2 lb/minute. A control formulation comprising the same yellow corn meal (moisture content of about 11.9%) and water was also run and compared against several formulations. Trial runs were compared to the control run and adjustments were made as necessary to achieve the target bulk density—that of the control group comprising only corn meal—about 4.6 lbs/cubic foot.

In the final run, the blend of agglomerated calcium was increased to about 1000 grams, with an increase in water to the dry mix from 2.0 liters to about 2.3 liters and an in-barrel moisture content of about 16.24%. The rotor position remained at about 2.07 mm, with an auger speed of about 144 rpm, resulting in a more acceptable product with a bulk density of about 4.8 lb/cubic foot. Table 4 below contains a comparison of the resulting data from these runs.

TABLE 4

Random extrusion parameters of Calcium Carbonate Micropellets

| Trial Run | 1 | 2 | 3 | 4 | 5 |
|---|---|---|---|---|---|
| Ca Agglomerate (g) | 861 | 861 | 861 | 861 | 1000 |
| Corn meal (lb) | 100 | 100 | 100 | 100 | 100 |
| Water to dry mix (L) | 2.0 | 2.0 | 2.0 | 2.3 | 2.3 |
| Calculated In-Barrel Moisture (%) | 15.7 | 15.7 | 15.7 | 18.00 | 16.24 |
| Rotor Position (mm) | 1.94 | 2.02 | 2.07 | 2.02 | 2.07 |
| Head Temp (C.) | 148 | 146 | 146 | 135 | 143 |
| Auger Speed (rpm) | 142 | 143 | 143 | 143 | 144 |
| Motor Load (%) | 50 | 48-49 | 49 | 45 | 45 |
| Auger Amps | 11.8 | 11.5 | 11.5 | 11.0 | 11.0 |
| Rotor Amps | 38.8 | 38.6 | 38.8 | 37.9-38 | 38.7-39.1 |
| Bulk Density (lb/cf) | 4.00 | 4.20 | 4.4 | 6.4 | 4.8 |

All but one sample achieved surprisingly good products, given the introduction of flours that otherwise negatively impact the product and the random extrusion equipment.

However, to achieve the desired bulk density, some adjustments were made to test the process parameters. In trial run number 2, an increase in rotor gap to about 2.02 mm with simultaneous increase in auger speed to about 143 rpm increased the bulk density from about 4.00 lb/cubic foot to about 4.20 lb/cubic foot. A subsequent increase in rotor gap to about 2.07 mm, in trial run number 3, further increased the bulk density to a more desirable 4.4 lb/cubic foot. Next, an increase in moisture content within the barrel to about 18% was tested, resulting in a degraded, less desirable product with a much higher bulk density of about 6.4 lb/cubic foot. Thus demonstrating the negative effect of a higher moisture content in the extruder. Without being bounded by theory, it is believe that the higher moisture content together with the sugar content degrades the product with tempering time.

EXAMPLE 5

Calcium Micropellets within Collet Matrix

With the same agglomerated calcium used in Example 4, about 861 pounds of agglomerate was combined with about 100 pounds of yellow corn meal (with a moisture content of about 12.0%). About 2.2 liters of water was added, with an in-barrel moisture content of about 16.19. The rotor gap was set to between about 1.856 mm and 1.940 mm in several trial runs. Head temperature was measured to be between about 143 to about 144 C, with auger speed at about 140 rpm. The same rotor speed of 501.50 rpm was used, resulting in acceptable collets having a bulk density of about 4.5 pounds/cubic foot.

EXAMPLE 6

Testing Protein Micropellets within a Random Extruder

To test the principle that the random extruder can handle conveyance of micropellets of protein as compared to the protein in loose, powder form, several formulations comprising proteins were tested in the random extruder. Formulation 1 was a control formula comprising 100% corn meal, as typically used in prior art. Formulation 2 comprised about 62.5% corn meal and about 27.5% powdered protein (Bio-Pro) in loose, unagglomerated state. Formulation 3 comprised about 85% corn meal and about 15% micropellets comprised of Porphyra, which contains proteins, vitamins and minerals.

As expected, formulation 2 resulted in the blockage of the extruder. On the other hand, the extruder was able to handle the inclusion of the Porphyra micropellets very well, though the resulting expanded extrudate was larger in size than the control. In addition, some of the micropellets did not melt. This was believed to be at least in part due to the shear zone of the stator (with a gap of about 0.084 inches or 0.21 mm), and a low moisture content, in which there was not enough of a plasticizing effect as to cause it to melt and expand as it was exposed to the drop in pressure. However, this proved to show that micropellets or solid agglomerates can be handled by the random extruder.

EXAMPLE 7

Random Extrusion of Formulations with Micropellet Mixtures

A formulation comprising about 59% corn meal and about 41% micropellets was extruded in a random extruder. More specifically, the micropellets were comprised of about 25% rice micropellets, 5% porphyra micropellets, 1% tapioca micropellets, and 10% combu micropellets. In a first trial run of this formulation, the resulting collets were long strips, which are characteristic of low moisture. In a second run, the moisture content of the corn meal and micropellets was increased to about 16.5%, which is more characteristic of a level used for corn meal alone. Acceptable collets were formed, while noting that the rice micropellets and tapioca micropellets melted better. However, the remaining micropellets in the mix remained intact, possibly due to the smaller size of these micropellets and/or the moisture level.

EXAMPLE 8

High Protein Formulations in the Random Extruder

A 50-lb batch of formulation was mixed to product random collets with 5 grams of protein per one ounce serving. Micropellets comprising SPI with a waxy corn starch were combined with corn grits in the following amounts: about 10.20 pounds of micropellets and about 39.8 pounds of corn meal. The corn meal was mixed with the protein micropellets and the mixture was hydrated to a moisture content of about 16%. After hydration, it was noted that the micropellets and corn grits were of a similar particle size. The hydrated mixture was metered into a random extruder using a gravimetric feeder. Processing parameters were adjusted to provide for better expansion, as processing under the traditional corn meal processing conditions yielded very poorly expanded products. Namely, feeder rpm was slowed down to about 130 rpm, and the quill position was increased to about 0.008 inch. Resulting collets showed no micropellet residue, indicating that the micropellets totally melted into the collet matrix. Flavor of the mixture of SPI and waxy starch was not perceived in the dried base.

EXAMPLE 9

High Protein Formulations in the Random Extruder

A 50-lb batch of formulation was mixed to produce random collets with 5 grams of protein per one ounce serving. Micropellets comprised of MPI and waxy corn starch were manufactured and pre-hydrated to a moisture content of about 17% by weight. The ratio of micropellet to corn meal was: MPI/waxy corn starch micropellets (70:30) at about 19.8% and corn meal at about 80.22%.

The micropellet-starch mixture was run through a random extruder comprising a stainless steel stator and the conveyor screw was modified to reduce the residence time of the material conveyed in the work zone. Processing parameters of the run is set forth below.

TABLE 5

Random Extruder parameters using Stainless Steel Stator

| Processing parameter | Corn Meal | 5 g/oz Formula | 10 g/oz Formula |
|---|---|---|---|
| Quill position | 0.0067 in | 0.0067 in. | 0.0082-0.0073 in |
| Auger rpm | 137 | 137 | 137 |
| Temperature (F.) | 276 | 276 | 267 |
| Auger Load | 0.50 | 0.50 | 0.50 |

Both formulas ran well using the stainless steel plate, with no visible micropellet residue in the collet matrices and no evidence of fouling on the extruder. The products ran completely from start to finish for over 15 minutes, which was an improvement over the bronze plate. The 5 g/oz Formula had a texture and appearance very similar to that of the corn meal control base formula, with a slightly white color. Milky flavor from the MPI was almost undetected, and there was good mouth fill with no tooth packing. However, the 10 g/oz formula had an undesirable mouthfeel, a lot of toothpacking, and a cooked dairy note.

EXAMPLE 10

Whole-Grain Cornmeal Formulations in the Random Extruder

Micropellets comprising of 100% whole-grain corn were manufactured using only (100%) ground corn kernel to manufacture the whole-grain corn micropellets. Thus, the micropellets may consist solely of whole grain seeds.

A 200 lb batch formulation was mixed to produce random collets with 8-grams of whole-grain per one ounce serving. The formulation comprised 34% whole-grain corn micropellets (9.5% moisture content) and 66% degermed cornmeal (12.4% moisture content). No direct pre-hydration was performed to the whole-grain corn micropellets. Instead, all necessary water to achieve formulation target of 16.5% moisture content was added only to the degermed cornmeal. After this exclusive pre-hydration of the degermed cornmeal was accomplished, whole-grain corn micropellets and exclusively prehydrated degermed cornmeal were blended and allowed to equilibrate for 4 hours. In addition, a control formula was prepared by blending 200 lb of degemed cornmeal and 9.9 lb of water for 15-20 min and allowed to equilibrate for 30 min. The 8-gram whole-grain/oz formulation and control formulation as described above were run through the random extruder with a standard bronze rotary die plate and no other special modifications. Processing parameters of the run is set forth below.

TABLE 6

Random Extruder parameters with whole-grain corn micropellets formulation.

| Processing parameter | Degermed Corn Meal (Control Formula) | 8-g whole-grain/oz Formula |
|---|---|---|
| Quill position | 0.0063 in | 0.0069 in. |
| Auger rpm | 142 | 142 |
| Stator Head Temperature (F.) | 288 | 284 |
| Bulk Density (lb/cu-ft) | 4.55 | 4.52 |

The control and 8-g whole-grain/oz formulas ran well using standard bronze plate and operating conditions, with no visible micropellet residue in the collet matrices and no evidence of fouling on the extruder. The products ran completely from start to finish for over 30 minutes. Moreover, the extrusion process was able to start-up with the 8-g whole-grain/oz Formula, which is not often possible when attempting to process whole-grain cornmeal. The 8-g whole-grain/oz Formula had bulk density, texture, appearance, and flavor, very similar to that of degermed cornmeal control formula, with a slightly less yellow color.

Micropellets made by way of extrusion, according to Example 10, and consisting of modified starch and whey protein isolate were analyzed using three analytical techniques for testing starch gelatinization, pasting profile, and degree of macromolecular degradation—1) differential scanning calorimetry (DSC), 2) rapid visco analysis (RVA), and 3) phase transition analysis (PTA). Results, further discussed below, indicated that the extruded micropellets completely gelatinize and exhibit an RVA peak viscosity of 63.5 cP, PTA flow of 112.7, and softening temperatures of about 53.0° C. Pellets made by way of marumerization (MRM) were also tested to compare with the extruded micropellets (EXT).

Sample Preparation

A falling number mill was used to grind the samples in a two-pass process, followed by sieving to obtain particle size below 500 µm. The moisture content of the ground sample was measured using AACC air oven method 44-19 in a Model 160DM Thelco Lab Oven (Precision Scientific, Chicago, Ill.) at 135° C. for 2 hours. The original moisture content of the samples was 10.1% (EXT1) and 10.5% (MRM). All moisture contents are expressed on wet basis.

Differential Scanning Calorimetry (DSC)

Approximately 10 mg of samples were hydrated to 66% moisture, sealed in steel pans and equilibrated overnight in a refrigerator. A standard gelatinization test was conducted by heating the pans in the DSC (Q100, TA Instruments, New Castle, Del.) from 10° to 140° C. at a heating rate of 10° C./min. Gelatinization temperature range (onset, peak and end) and enthalpy were determined for each sample. All tests were carried out in duplicate.

Figure 12A:
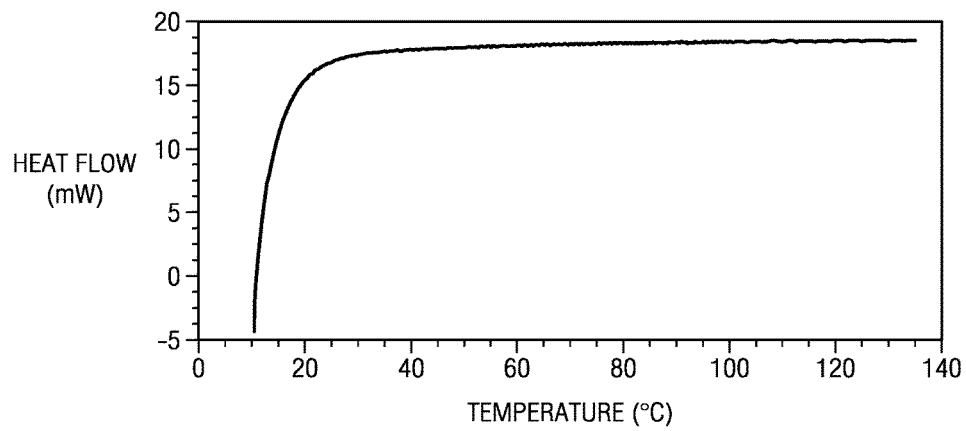
FIG. 12A depicts a differential scanning calorimetry scan for micropellets in one embodiment.
Figure 12B:
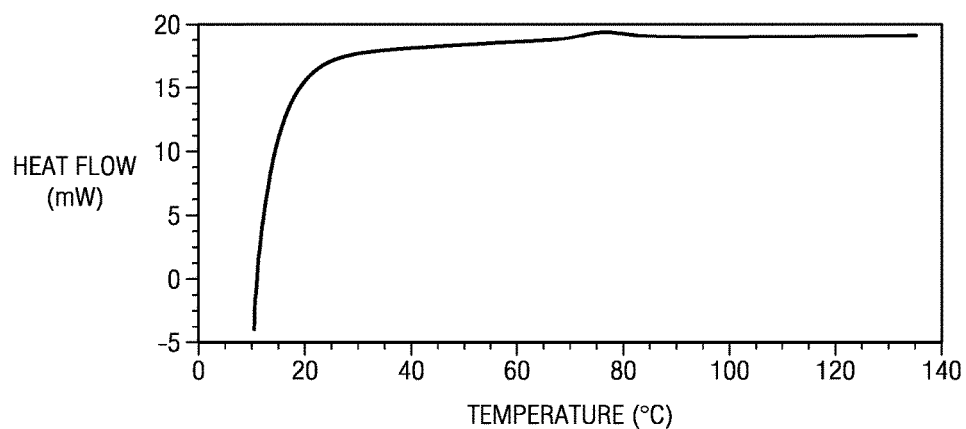
FIG. 12B depicts a differential scanning calorimetry scan for micropellets made by way of marumerization.

FIG. 12A depicts the DSC scan for the extruded micropellets (EXT). FIG. 12B depicts the DSC scan for micropellets made by way of marumerization (MRM). The corresponding data for the residual gelatinization properties of the MRM sample can be found below in Table 7.

TABLE 7

Residual gelatinization properties of MRM micropellets

| | MRM rep 1 | MRM rep 2 | Avg | Std Dev |
|---|---|---|---|---|
| Start temp (° C.) | 68.35 | 67.72 | 68.04 | 0.45 |
| Peak temp (° C.) | 76.04 | 75.71 | 75.88 | 0.23 |
| End temp (° C.) | 88.12 | 85.82 | 86.97 | 1.63 |
| Enthalpy (J/g) | 4.176 | 4.584 | 4.38 | 0.29 |

Both replicates of the DSC scans revealed that the EXT sample did not exhibit any peak, which indicates that the starch was completely gelatinized. On the other hand, the MRM sample had a residual gelatinization peak, which indicates that a substantial portion of the starch in the product was still ungelatinized. Specifically, Table 7 indicates a peak gelatinization temperature of 75.88±0.23 that is fairly typical for many starches. The typical gelatinization enthalpy of native starches range from 5-20 J/g. The MRM sample had a residual enthalpy of gelatinization of 4.38±0.29 J/g, confirming that a substantial amount of the starch was ungelatinized.

Rapid Visco Analysis (RVA)

Pasting properties of the EXT and MRM samples were also determined using a rapid visco analyser (RVA4, Newport Scientific Pty. Ltd., Australia). For RVA analysis, sample moisture was first adjusted to 14% by adding distilled water. Specifically, 3 grams of sample was added to 25 ml of water in an aluminum test canister. The RVA was preheated to 50° C. for 30 minutes prior to testing. A 13 min standard RVA temperature profile was used: 1 min holding at 50° C., 3 minutes 42 second temperature ramp up to 95° C., 2 minutes 30 seconds holding at 95° C., 3 minutes 48 second temperature ramp down to 50° C., and 2 minutes holding at 50° C. Pasting properties, such as peak, trough and final viscosities, were determined. All tests were carried out in duplicate.

Figure 13A:
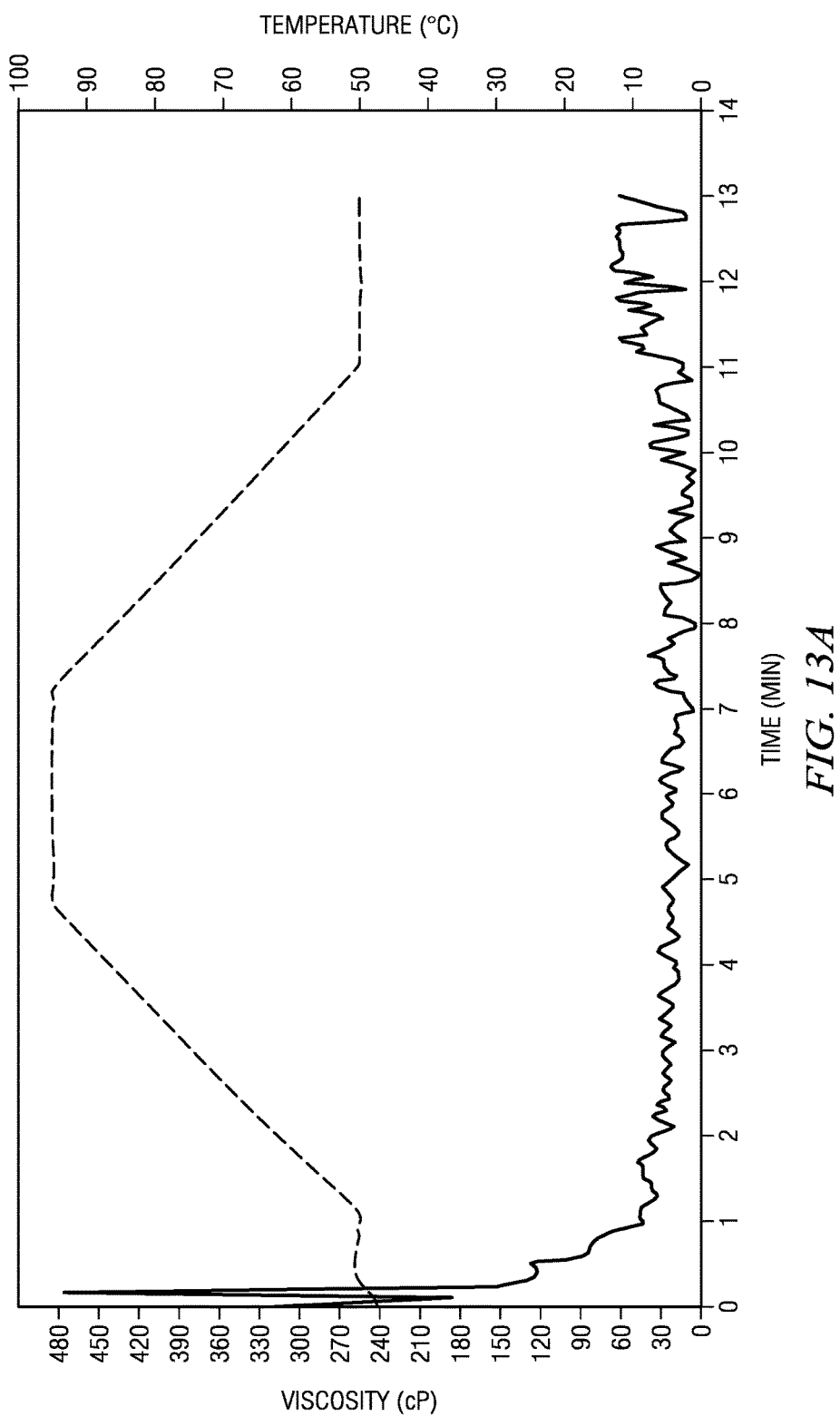
FIG. 13A depicts a rapid visco analyzer pasting curve for the micropellets in one embodiment.
Figure 13B:
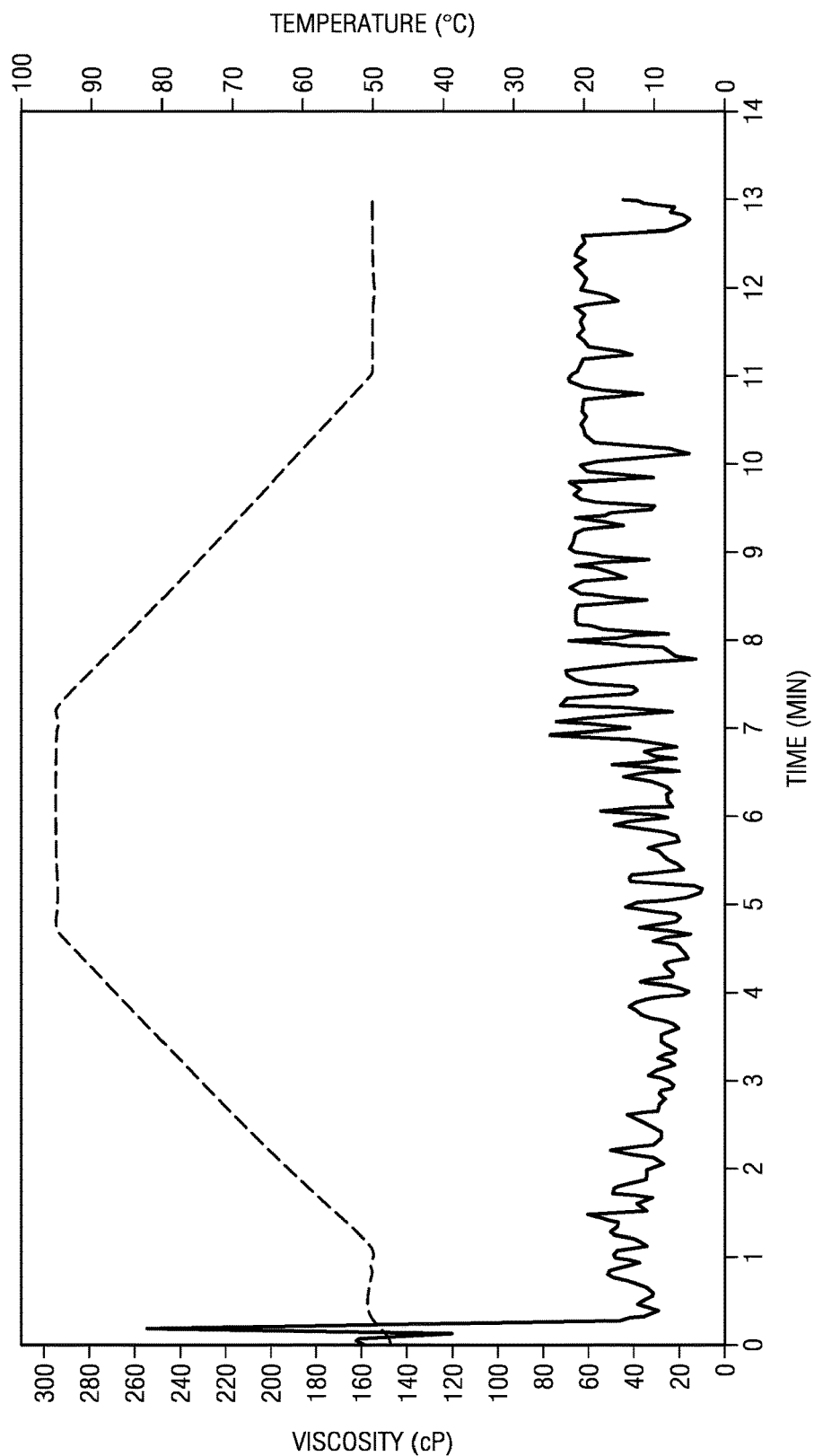
FIG. 13B depicts a replicate run of a rapid visco analyzer pasting curve for the micropellets of FIG. 13A.
Figure 14A:
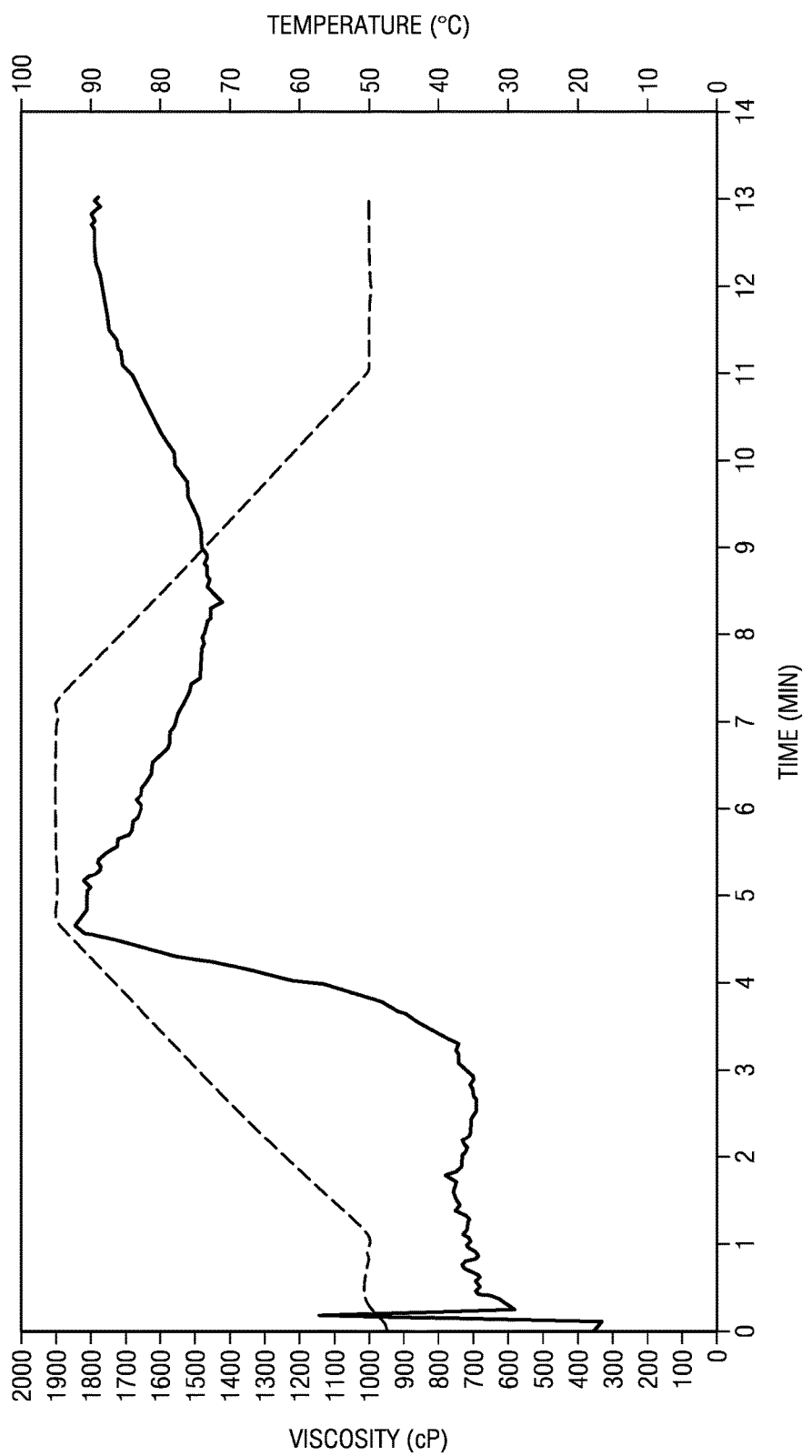
FIG. 14A depicts a rapid visco analyzer pasting curve for micropellets made by way of marumerization.
Figure 14B:
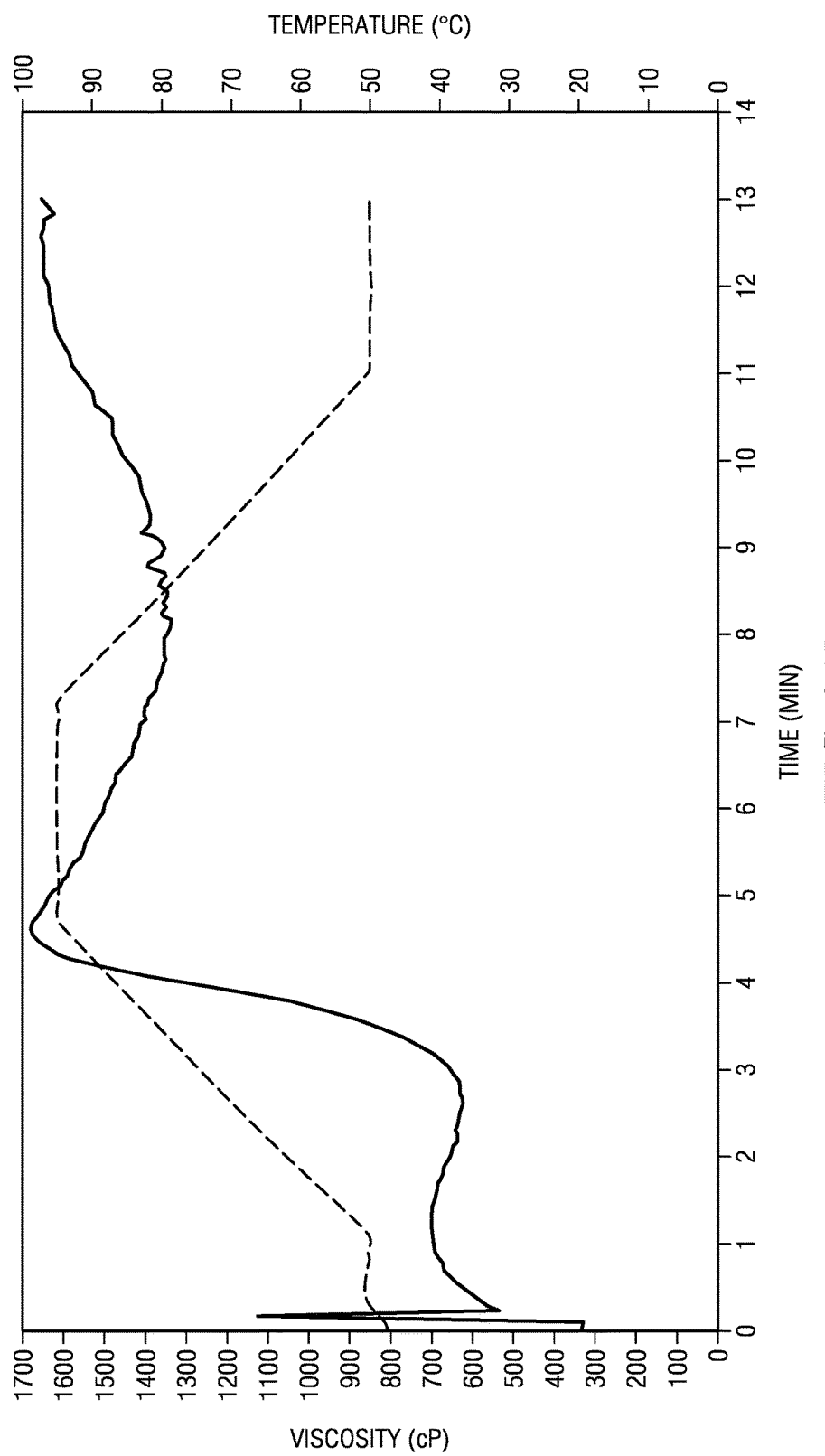
FIG. 14B depicts a replicate run of a rapid visco analyzer pasting curve for micropellets of FIG. 14A.

The results of the RVA are summarized below in Table 8. The RVA pasting curves for the sample runs of the E×T samples are shown in FIGS. 13A and 13B. The EXT sample did not exhibit much increase in viscosity as the testing proceeded. As shown in Table 8, the EXT sample comprised an average peak viscosity of about 63.5 cP. This indicates that the starch fraction was degraded during the processing and had lost all or most of its swelling capacity. On the other hand, as depicted in FIGS. 14A and 14B, the MRM sample had a substantially higher peak viscosity. Table 8 shows the average peak viscosity for the MRM sample runs to be about 1761.5 cP, which indicates that their processing conditions were less severe and the starch fraction retained its swelling capacity.

TABLE 8

Pasting (RVA) parameters for (a) EXT and (b) MRM samples.

|  | Peak (cP) | Trough (cP) | Breakdown (cP) | Final (cP) | Setback (cP) | Peak time (min) | Pasting Temp (° C.) |
|---|---|---|---|---|---|---|---|
| (a) | | | | | | | |
| EXT1 rep1 | 79.0 | 15.0 | 64.0 | 46.0 | 31.0 | 6.9 | 57.4 |
| EXT1 rep2 | 48.0 | 1.0 | 47.0 | 62.0 | 61.0 | 1.7 | 95.0 |
| Average | 63.5 | 8.0 | 55.5 | 54.0 | 46.0 | 4.3 | 76.2 |
| Std Dev | 21.9 | 9.9 | 12.0 | 11.3 | 21.2 | 3.7 | 26.6 |
| (b) | | | | | | | |
| MRM rep1 | 1682.0 | 1340.0 | 342.0 | 1650.0 | 310.0 | 4.6 | 75.9 |
| MRM rep2 | 1841.0 | 1424.0 | 417.0 | 1789.0 | 365.0 | 4.7 | 50.2 |
| Average | 1761.5 | 1382.0 | 379.5 | 1719.5 | 337.5 | 4.6 | 63.0 |
| Std Dev | 112.4 | 59.4 | 53.0 | 98.3 | 38.9 | 0.0 | 18.2 |

Phase Transition Analyzer (PTA)

PTA is a relatively new method for determining the softening temperature (Ts) and flow temperature (Tf) of a bio polymeric material. These are flow-based measurements and are similar to glass transition (Tg) and melting (Tm) temperatures, although the latter are thermal events. The PTA characterizes softening and flow transitions of complex recipes by using a combination of time, temperature, pressure and moisture. It consists of two sealed chambers separated by an interchangeable capillary die. The chambers house electric heaters and contain a hollow cavity for cooling fluid. The pistons are mounted together through sidebars. Air cylinders are mounted at the bottom and maintained at constant pressure. A linear-displacement transducer measures the sample's deformation, compaction and flow relative to initial sample height, as the sample temperature is raised at a set rate under pressurized conditions.

For phase transition analysis of the EXT and MRM samples, samples were equilibrated overnight in a relative humidity chamber at 99% RH for adjustment of moisture. The final moistures prior to testing were 12.5 and 13%, respectively, for EXT and MRM. Approximately 2 g sample was introduced into the test chamber of the Phase Transition Analyzer (Wenger Manufacturing Inc., Sabetha, Kans.), and subject to initial compaction at 100 kPa with a blank die (no opening) underneath. Temperature was then ramped up at 8° C. per min with a starting temperature of 1° C., while maintaining the chamber pressure at 80 kPa. Ts was obtained as the midpoint of the temperature range over which the sample exhibited softening (displacement over a set threshold of 0.0106 mm/° C. as measured by a transducer). The blank die was then replaced by a 2 mm capillary die and heating was continued. Tf was obtained as the temperature at which the sample started to flow through the capillary.

Figure 15A:
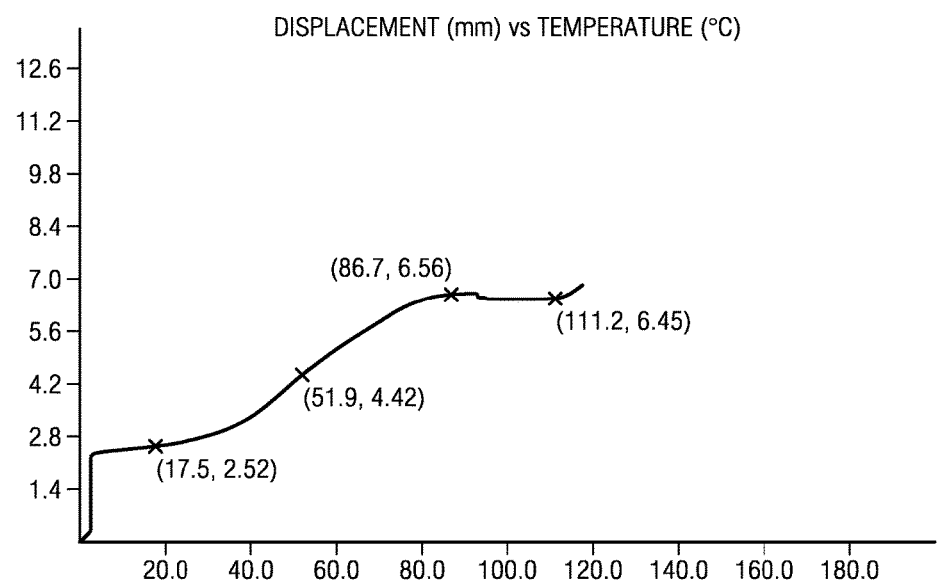
FIG. 15A depicts a phase transition analyzer scan for the micropellets in one embodiment.
Figure 15B:
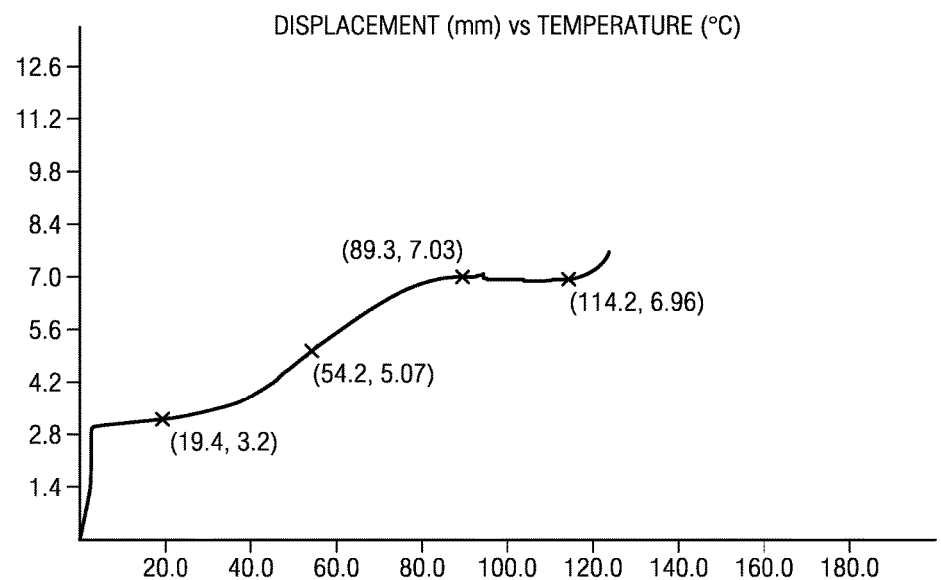
FIG. 15B depicts a replicate run of a phase transition analyzer scan for the micropellets of FIG. 15A.
Figure 16A:
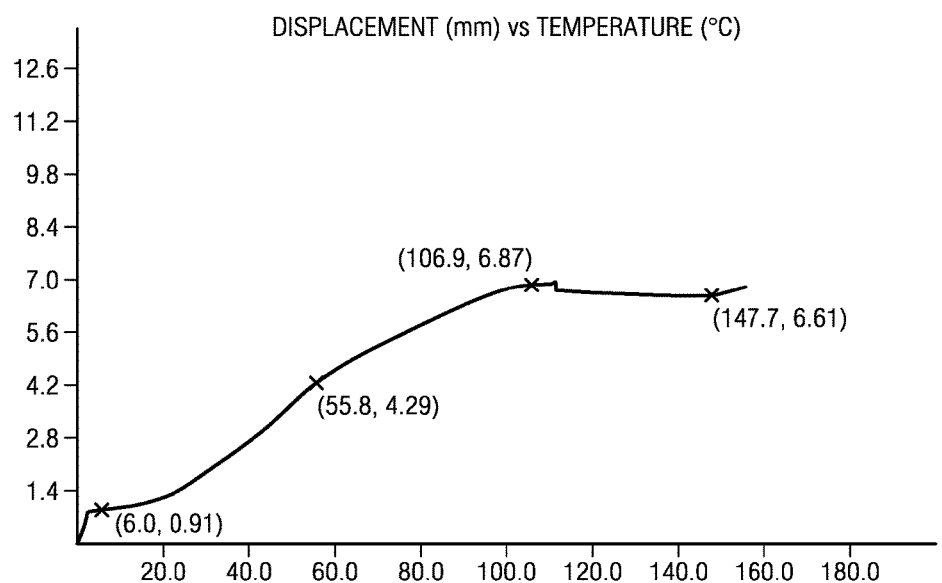
FIG. 16A depicts a phase transition analyzer scan for micropellets made by way of marumerization.
Figure 16B:
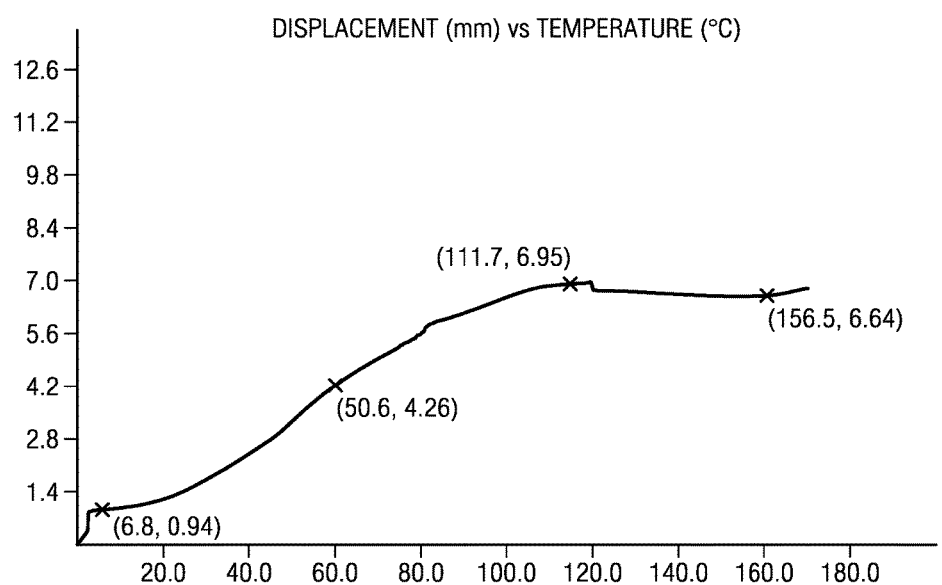
FIG. 16B depicts a replicate run of a phase transition analyzer scan for micropellets of FIG. 16A.

The results of the PTA scans are shown in FIGS. 15A and 15B (EXT runs) and FIGS. 16A and 16B (MRM runs), with corresponding data summarized below in Table 9.

TABLE 9

PTA data

|  | $T_s$ (° C.) | | | Std | $T_f$ (° C.) | | | Std |
|---|---|---|---|---|---|---|---|---|
|  | Rep1 | Rep2 | Avg | Dev | Rep1 | Rep2 | Avg | Dev |
| EXT1 | 54.2 | 51.9 | 53.0 | 1.6 | 114.2 | 111.2 | 112.7 | 2.1 |
| MRM | 55.8 | 58.6 | 57.2 | 2.0 | 163.5 | 157.9 | 160.7 | 4.0 |

The above PTA data supports the inference made from analysis of RVA results. The EXT sample had lower Ts than the MRM sample (53.0±1.6° C. versus 57.2±° C.). The former also had a substantially lower Tf (112.7±2.1° C. versus 160.7±4.0° C.). This indicates that the EXT micropellets had a higher macromolecular degradation than the MRM.

The above examples help to illustrate several advantages of the method and formulations described herein. First, because the micropellets in one embodiment are created using methods with low shear, degradation of heat labile nutrients is substantially eliminated. Second, the micropellets may be used to encapsulate flavors for inclusion within snack foods. In particular, flavors that are typically highly volatile may be introduced to maintain the taste sensation provided by the flavors even after long storage times. In addition, aromas that are otherwise volatile can be likewise maintained. Third, the micropellets can be used to entrap and maintain color such that natural vegetable and fruit powders can be used to add color to snack foods. Fourth, infinite combinations of base agglomerates made with starches such as rice, tapioca, potato, corn and any combination thereof with other ingredients that may add other nutritional value to snack foods are possible, while maintaining the texture of the foods. For the random collet, this is especially advantageous given the ability to add and use different nutritional components to an already unique snack food, making the random collet unique in many aspects. Addition of highly desirable nutritional components such as protein will increase the demand and popularity of the random collet, which is already desirable for its crunchy texture. Sixth, the micropellets provide a more uniform particle size for random extrusion processes; thus, reducing the issue of conveyance to vary the ingredients of the random collet.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Unless otherwise defined, all technical and scientific terms and abbreviations used herein have the same meaning as commonly understood by one of ordinary skill in the art to which the invention pertains.

The method illustratively disclosed herein suitably may be practiced in the absence of any element which is not specifically disclosed herein. In some embodiments, the methods described herein may suitably comprise, consist of, or consist essentially of, the steps disclosed. Similarly, the formulations may comprise, consist of, or consist essentially of the components disclosed. Individual numerical values and/or ranges are stated as approximations as though the values were preceded by the word "about" or "approximately." As used herein, the terms "about" and "approximately" when referring to a numerical value shall have their plain and ordinary meanings to a person of ordinary skill in the art to which the disclosed subject matter is most closely related.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, all modifications and equivalents of the subject matter recited in the claims appended hereto are included within the scope of the claims as permitted by applicable law. Moreover, any combination of the above-described elements in all possible variations thereof is encompassed unless otherwise indicated herein or otherwise clearly contradicted by context.

What is claimed is:

1. A method of manufacturing a snack food product, said method comprising:
    forming an expandable micropellet-containing formulation from a plurality of discrete micropellets, wherein each of the plurality of discrete micropellets comprises fine particle components agglomerated therein, wherein each of the plurality of discrete micropellets comprises a particle size distribution wherein at least 75% of the micropellets are larger than 50 mesh; and
    cooking said expandable micropellet-containing formulation to form the snack food product, wherein the cooking step expands at least some of the discrete micropellets.

2. The method of claim 1 wherein said micropellet-containing formulation consists only of said plurality of micropellets.

3. The method of claim 1 wherein said micropellet-containing formulation further comprises an expandable starch-comprising component.

4. The method of claim 3 wherein said expandable starch-comprising component comprises unagglomerated particles derived from corn.

5. The method of claim 4 wherein said unagglomerated starch particles comprise a particle size distribution wherein between about 30% to about 65% of said particles fall between 500 to about 700 microns.

6. The method of claim 4 further comprising the step of pre-hydrating corn meal with a water based solution prior to the forming step.

7. The method of claim 6 wherein said corn meal is pre-hydrated to a moisture content of between about 18% to about 25%.

8. The method of claim 6 further comprising the step of separately pre-hydrating said plurality of discrete micropellets prior to the forming step.

9. The method of claim 4 wherein said plurality of discrete micropellets and said unagglomerated particles are pre-hydrated together prior to the forming step.

10. The method of claim 4 wherein said plurality of discrete micropellets and said unagglomerated particles are pre-hydrated to a moisture content of between about 15% to about 17%.

11. The method of claim 1 wherein said micropellet-containing formulation further comprises a sheetable dough, said plurality of micropellets having been combined with said dough prior to said cooking step.

12. The method of claim 11 wherein said plurality of micropellets is embedded within said dough.

13. A food product made by the method of claim 11.

14. The method of claim 1 wherein said micropellet-containing formulation further comprises an expanded collet, wherein said plurality of micropellets is adhered to the surface of said expanded collet to form a basted collet prior to the cooking step.

15. The method of claim 14 wherein said plurality of micropellets is basted onto the surface of said expanded collet using a biopolymer emulsion.

16. The method of claim 15 wherein said cooking step comprises frying said basted collet.

17. A food product made by the method of claim 14.

18. The method of claim 1 wherein said fine particle components are comprised of a mineral.

19. The method of claim 1 wherein said fine particle components are comprised of calcium.

20. The method of claim 1 wherein said fine particle components are comprised of a protein.

21. The method of claim 20 wherein said micropellets comprise between about 40% to about 80% protein.

22. The method of claim 20 wherein said protein comprises milk protein isolate.

23. The method of claim 20 wherein said protein comprises soy protein isolate.

24. The method of claim 20 wherein said protein is derived from an animal, plant or marine source.

25. The method of claim 1 wherein said fine particle components are comprised of whole grains.

26. The method of claim 1 wherein said micropellet-containing formulation comprises between about 15% to about 70% hydrated corn meal.

27. The method of claim 1 further comprising the step of pre-hydrating said plurality of discrete micropellets with a water based solution to a moisture content of between about 7% to about 15% prior to the forming step.

28. The method of claim 1 wherein said micropellet-containing formulation comprises between about 30% to about 75% micropellets.

29. The method of claim 1 wherein said micropellets comprise a diameter of at least about 500 microns.

30. The method of claim 1 wherein said micropellets comprise a diameter of between about 500 to about 700 microns.

31. The method of claim 1 wherein said micropellets are further comprised of one or more of: waxy starch, native corn starch, tapioca and potato starch, maltodextrin and products derived therefrom.

32. The method of claim 1 wherein said plurality of micropellets are pre-cooked.

33. The method of claim 1 wherein each of said discrete micropellets is comprised of a waxy corn starch and wherein the fine particle components comprise soy protein isolate.

34. The method of claim 33 wherein each of said discrete micropellets comprises soy protein isolate and waxy corn starch at a ratio of between about 60:40 and about 70:30.

35. The method of claim 1 wherein said fine particle component comprises milk protein isolate and wherein each of said discrete micropellets further comprises at least one of the following: waxy corn starch and potato starch.

36. The method of claim 35 wherein said micropellets comprise the milk protein isolate and one of said starches at a ratio of between about 60:40 to about 70:30.

37. The method of claim 1 wherein said micropellets further comprise up to about 10% micro crystalline cellulose.

38. The method of claim 1 wherein said cooking step is substantially performed within a die assembly of a random extruder, thereby creating expanded random collets.

39. The method of claim 38 wherein random extruder comprises a stainless steel rotor.

40. A food product made by the method of claim 38.

41. The method of claim 1 wherein said cooking step is selected from the group consisting of random extrusion, baking, and frying.

42. The method of claim 1 wherein said micropellets comprise a particle size of less than about 0.3 mm in diameter, and further comprising the step of pre-expanding said micropellets prior to the forming step.

43. The method of claim 42 wherein said pre-expanding step comprises one or more of: roasting, microwaving, and baking.

44. The method of claim 1 further comprising an additional cooking step to create a shelf-stable product having a moisture content of about 2%, and wherein said additional cooking step is selected from the group consisting of baking and frying.

45. The method of claim 1 further comprising the step of seasoning said food product.

46. The method of claim 1 wherein said micropellets are derived from extrusion processes.

47. A method for varying a formulation suitable for incorporation into a random extruder, wherein said method comprises:
introducing into the random extruder an expandable mixture comprising a plurality of micropellets, said micropellets having fine particle components agglomerated therein; and
extruding the mixture of micropellets through the random extruder to provide a snack food product comprising expanded micropellets, wherein at least some the micropellets expand upon cooking.

48. The method of claim 47 wherein said micropellets comprise at least 60% of said fine particle components.

49. The method of claim 47 wherein said fine particle components are selected from the group consisting of protein, mineral, vitamin, fiber, fruit, vegetable, grain, meat, and any non-starch derivative.

50. The method of claim 47 wherein said micropellets comprise a bulk density of between about 500 to about 700 g/L.

51. The method of claim 47 wherein said micropellets comprise up to 10% microcrystalline cellulose.

52. The method of claim 47 wherein the random extruder of said extruding step comprises a stainless steel rotor plate.

53. The method of claim 47 wherein said mixture comprising said plurality of micropellets further comprises an expandable starch component.

54. The method of claim 53 wherein said expandable starch component is selected from the group consisting of corn, potato, rice, and tapioca.

55. The method of claim 47 wherein said fine particle components comprise protein selected from the group consisting of milk protein isolate, soy protein isolate, and whey protein isolate.

56. The method of claim 47 wherein said fine particle components comprise protein derived from the group consisting of animal, plant or marine source.

\* \* \* \* \*